(12) United States Patent
Park

(10) Patent No.: US 10,751,653 B2
(45) Date of Patent: Aug. 25, 2020

(54) HEAD ASSEMBLY FOR WATER PURIFICATION FILTER

(71) Applicant: CHEONGHOSYSTEM CO., LTD., Jinju-si, Gyeongsangnam-do (KR)

(72) Inventor: Yongwoon Park, Jinju-si (KR)

(73) Assignees: CHEONGHOSYSTEM CO., LTD., Jinju-si, Gyeongsangnam-do (KR); LG ELECTRONICS INC., Seoul (KR)

( * ) Notice: Subject to any disclaimer, the term of this patent is extended or adjusted under 35 U.S.C. 154(b) by 244 days.

(21) Appl. No.: 15/738,790

(22) PCT Filed: Oct. 26, 2017

(86) PCT No.: PCT/KR2017/011900
§ 371 (c)(1),
(2) Date: Dec. 21, 2017

(87) PCT Pub. No.: WO2018/084489
PCT Pub. Date: May 11, 2018

(65) Prior Publication Data
US 2018/0318739 A1    Nov. 8, 2018

(30) Foreign Application Priority Data

Nov. 4, 2016  (KR) .................. 10-2016-0146701
Nov. 4, 2016  (KR) .................. 10-2016-0146709

(51) Int. Cl.
*B01D 35/30*  (2006.01)
*B01D 35/147*  (2006.01)
*C02F 1/00*  (2006.01)

(52) U.S. Cl.
CPC ........... *B01D 35/30* (2013.01); *B01D 35/147* (2013.01); *B01D 2201/302* (2013.01);
(Continued)

(58) Field of Classification Search
CPC ...... B01D 2201/302; B01D 2201/4023; B01D 35/147; B01D 35/306; B01D 29/21; B01D 46/2414
See application file for complete search history.

(56) References Cited

U.S. PATENT DOCUMENTS 6,360,764 B1 *  3/2002  Fritze .................. B01D 35/153
                                                   137/15.01
8,888,998 B2    11/2014  Swain
(Continued)

FOREIGN PATENT DOCUMENTS

KR    20-1986-0001110 Y1    6/1986
KR         20-0426860 Y1    9/2006
(Continued)

*Primary Examiner* — Ana M Fortuna
(74) *Attorney, Agent, or Firm* — Novick, Kim & Lee, PLLC; Jae Youn Kim

(57) ABSTRACT

Provided is a head assembly for a water purification filter, which includes a head body, a rotation shaft, and a fastening cap. In particular, the rotation shaft is rotated in the state of being placed on a seat protrusion formed on the head body, and a lower seal member is disposed in the portion where the rotation shaft is placed on the seat protrusion. Accordingly, there can be prevented a problem in which the lower seal member departs from a predetermined location during the coupling of the rotation shaft to the head body so that defective assembly occurs.

4 Claims, 25 Drawing Sheets

(52) U.S. Cl.
CPC .. *B01D 2201/303* (2013.01); *B01D 2201/304* (2013.01); *B01D 2201/4061* (2013.01); *C02F 1/001* (2013.01); *C02F 2201/004* (2013.01)

(56) References Cited

U.S. PATENT DOCUMENTS

| | | | |
|---|---|---|---|
| 8,950,052 B2 | 2/2015 | Kruckenberg et al. | |
| 2012/0031821 A1* | 2/2012 | Swain | B01D 35/147 210/87 |
| 2013/0067718 A1* | 3/2013 | Kruckenberg | B01D 35/30 29/464 |
| 2014/0231336 A1* | 8/2014 | Pribanic | B01D 27/08 210/446 |
| 2019/0106333 A1* | 4/2019 | Campbell | C02F 1/003 |

FOREIGN PATENT DOCUMENTS

| | | |
|---|---|---|
| KR | 10-2013-0004102 A | 1/2013 |
| KR | 101311654 B1 | 9/2013 |
| KR | 10-1480993 B1 | 1/2015 |
| KR | 10-1568985 B1 | 11/2015 |

\* cited by examiner

HEAD ASSEMBLY FOR WATER PURIFICATION FILTER

TECHNICAL FIELD

The present invention relates generally to a water purification filter, and more specifically to a new type of head assembly for a water purification filter, which enables the control of use for individual purposes to be accurately performed while enabling use for the purpose of the provision of direct water without passage through a water purification filter or use for the purpose of the provision of purified water via passage through the water purification filter, and which can ensure operability and the stable maintenance of water-tightness while facilitating the coupling between a head body and a rotation shaft.

BACKGROUND ART

Generally, water purification filters are used in water purifiers, and function to filter out various types of impurities, contaminants, or bacteria mixed with filtration target raw water.

Such a water purification filter is configured such that a head assembly is installed therein and the inflow and outflow of raw water can be guided via the head assembly. In connection with this, technologies are disclosed in Korean Patent No. 10-1568985, Korean Patent Application Publication No. 10-2013-0004102, Korean Utility Model Registration No. 20-0426860, and Korean Patent No. 10-1480993.

However, the head assemblies of water purification filters according to the above-described prior art are configured such that raw water always passes through water purifiers. Accordingly, it is impossible to use direct water without the intervention of the water purifiers.

Of course, although a switching valve device configured to enable raw water to be used as direct water or to enable raw water to be converted into purified water and to enable the purified water to be used and disclosed in Korean Utility Model Application No. 20-1986-0001110 has been provided in the past, problems arise in that the structure thereof is complex, so that it is difficult to manufacture it, there are many leakage portions, and there are many inconveniences in use.

Furthermore, the head assemblies of the water purification filters according to the prior art are each provided with a seal member configured to prevent fluid (raw water or purified water) from leaking. Such a seal member is installed on a rotating portion, and is thus mounted loosely compared to a seal member mounted using a tight fitting method. When individual components are assembled together, a problem arises in that the seal member is not maintained at a predetermined location and departs from the location or the assembly of the individual components becomes defective.

DISCLOSURE

Technical Problem

The present invention has been conceived to overcome the above-described problems of the prior art, and an object of the present invention is to provide a new type of head assembly for a water purification filter, which enables the control of use for individual purposes to be accurately performed while enabling use for the purpose of the provision of direct water without passage through a water purification filter or use for the purpose of the provision of purified water via passage through the water purification filter, and which can ensure operability and the stable maintenance of water-tightness while facilitating the coupling between a head body and a rotation shaft.

Technical Solution

In order to accomplish the above object, an aspect of the present invention provides a head assembly for a water purification filter, the head assembly including: a head body formed as a pipe body open on the top and bottom thereof while forming the appearance of the head assembly, and configured such that the open upper end of a water purification filter is accommodated in the lower portion thereof, an inflow pipe and an outflow pipe are provided on both sides thereof, and a seat protrusion is formed to protrude from the inner circumferential surface thereof; and a rotation shaft: configured to include a seating portion located between the inflow pipe and the outflow pipe inside the head body and installed to be rotatable in a lateral direction in the state of being placed on the seat protrusion, and a coupling portion configured to extend to the bottom of the seating portion while having a smaller diameter than the seating portion and to be coupled to the water purification filter; and configured such that a bypass hole configured to guide raw water, introduced through the inflow pipe of the head body, directly to the outflow pipe and guide holes configured to guide the raw water, introduced into the inflow pipe of the head body, into the water purification filter are formed in a circumferential surface of the seating portion.

In this case, a seat projection located opposite to the top surface of the seat protrusion inside the head body is formed to protrude from the lower end-side circumferential surface of the seating portion constituting part of the rotation shaft; a ring-shaped lower seal member is provided between the seat projection and the seat protrusion; and a ring-shaped upper seal member is mounted on the upper end-side circumferential surface of the seating portion constituting part of the rotation shaft.

Furthermore, a protruding seat end configured to protrude inward is further formed on the lower end-side portion of the inner circumferential surface of the seat protrusion; and the lower end of the seating portion constituting part of the rotation shaft forms a shaft end having a reduced diameter so that the lower end of the seating portion is placed on the protrusion seat end while being accommodated inside the seat protrusion.

Furthermore, the protruding seat end is formed to be inclined inward or rounded in a direction toward the bottom thereof; and the corner of the bottom surface of the shaft end of the seating portion constituting part of the rotation shaft is formed to be placed on the protruding seat end while having the structure of being inclined or rounded in the same shape as the protruding seat end.

Furthermore, a fastening cap is further provided on the open top surface of the head body; and a limiting protrusion is formed to protrude from the bottom surface of the fastening cap and a protruding stop protrusion formed to protrude so as to caught on the limiting protrusion of the fastening cap when the rotation shaft is rotated and to thus prevent the rotation shaft from being rotated further is formed on the top surface of the rotation shaft so that the relative rotation angle between the fastening cap and the rotation shaft is limited.

Additionally, in order to accomplish the above object, another aspect of the present invention provides a head assembly for a water purification filter, the head assembly including: a head body formed as a pipe body open on the top and bottom thereof while forming the appearance of the head assembly, and configured such that the open upper end of a water purification filter is accommodated in the lower portion thereof, and an inflow pipe configured to receive raw water and an outflow pipe configured to discharge bypassed raw water or purified water passed through the filter are formed to protrude from both sides of the head body; a rotation shaft installed to traverse between the inflow pipe and the outflow pipe inside the head body in a vertical direction, configured to be rotated within the head body by the lateral rotation of the water purification filter in the state of being coupled to the upper end portion of the water purification filter, and configured such that a bypass hole configured to guide raw water, introduced through the inflow pipe of the head body, directly to the outflow pipe and guide holes configured to guide the raw water, introduced into the inflow pipe of the head body, into the water purification filter are formed in a circumferential surface thereof; and a fastening cap installed to cover the open top surface of the head body, and provided with a limiting protrusion which limits the rotation angle of the rotation shaft.

In this case, a seat protrusion is formed to protrude from the inner circumferential surface of the head body; a seat projection configured to be placed on the seat protrusion is formed to protrude from the circumferential surface of the rotation shaft; and a ring-shaped seal member is provided in a portion of the circumferential surface of the rotation shaft between the seat projection and the seat protrusion.

Furthermore, an inclined seat end inclined to gradually extend further in an upward direction is formed on the inner circumferential surface of an upper end in the head body; and an inclined and extended end formed to gradually extend further in an upward direction so as to be seated on the inclined seat end of the head body is formed on the outer circumferential surface of the upper end of the rotation shaft.

Furthermore, a stop protrusion configured to, when the rotation shaft is rotated, be caught on the limiting protrusion of the fastening cap and prevent the rotation shaft from being rotated further is formed to protrude from the top surface of the rotation shaft.

Furthermore, the guide holes of the rotation shaft are configured to include: a first horizontal guide hole formed to penetrate from any one circumferential surface of the rotation shaft in a radial direction, and configured to receive raw water from the inflow pipe and to guide the flow of the raw water in a horizontal direction; a first vertical guide hole formed to penetrate vertically from an end of the first horizontal guide hole to the bottom thereof, and configured to guide the flow of the raw water to the inner space of the water purification filter; a second vertical guide hole configured to guide the flow of purified water in the inner space of the water purification filter; and a second horizontal guide hole formed to penetrate from the upper end of the second vertical guide hole to a portion where the outflow pipe is formed in a horizontal direction.

Advantageous Effects

As described above, the head assembly for a water purification filter according to the present invention has an effect of enabling the control of use for individual purposes to be accurately performed while enabling use for the purpose of the provision of direct water without passage through the water purification filter or use for the purpose of the provision of purified water via passage through the water purification filter.

Furthermore, the head assembly for a water purification filter according to the present invention has an effect of configuring the seal member located on the lower portion so that the seal member can seal the gap between the bottom surface and circumferential surface of the rotation shaft while additionally installing the plurality of seal members on the circumferential surface of the rotation shaft, thereby enabling the more stable maintenance of water-tightness.

Moreover, the head assembly for a water purification filter according to the present invention has an effect of preventing a problem in which the lower seal member is separated or departs from a predetermined location even when the rotation shaft is caught on a corner portion of the inflow hole or outflow hole during the mounting of the rotation shaft in the head body, and an effect of enabling the more stable maintenance of water-tightness.

MODE FOR INVENTION

Preferred embodiments of a head assembly for a water purification filter according to the present invention will be described below with reference to FIGS. 1 to 25.

Figure 1:
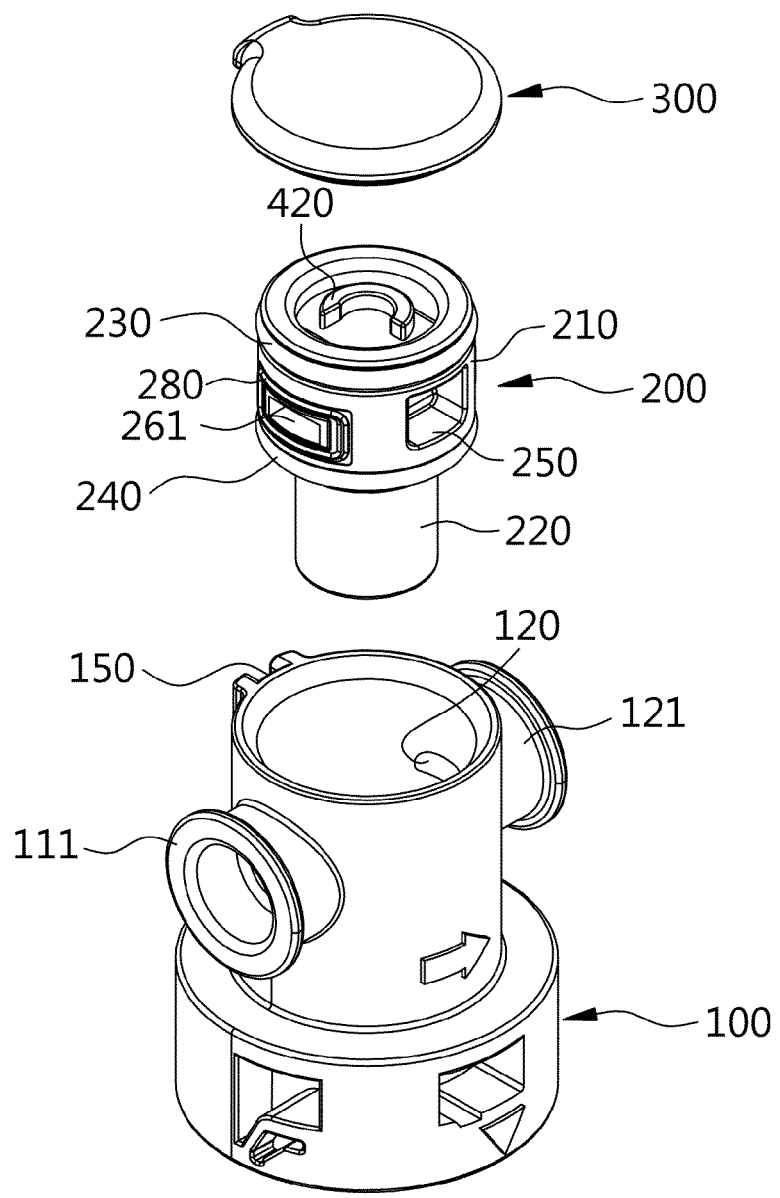
FIG. 1 is an exploded perspective view showing a state viewed from above in order to illustrate a head assembly for a water purification filter according to a preferred first embodiment of the present invention.
Figure 2:
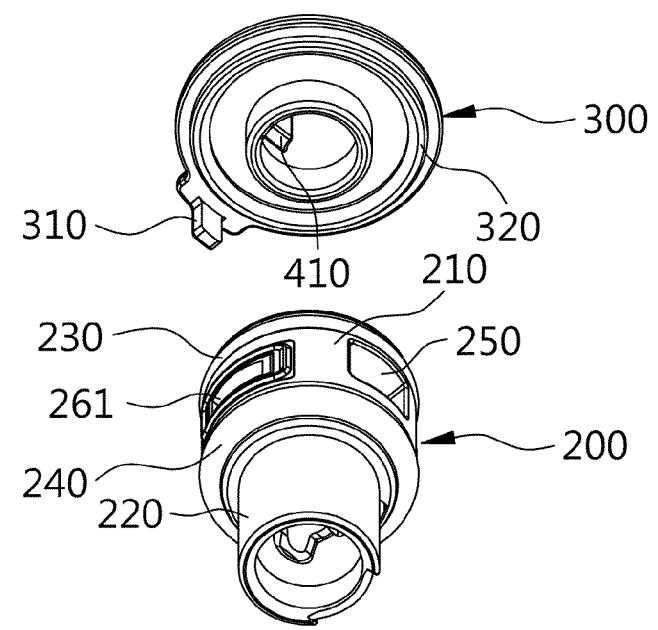
FIG. 2 is an exploded perspective view showing a state viewed from below in order to illustrate the head assembly for a water purification filter according to the preferred first embodiment of the present invention.
Figure 2:
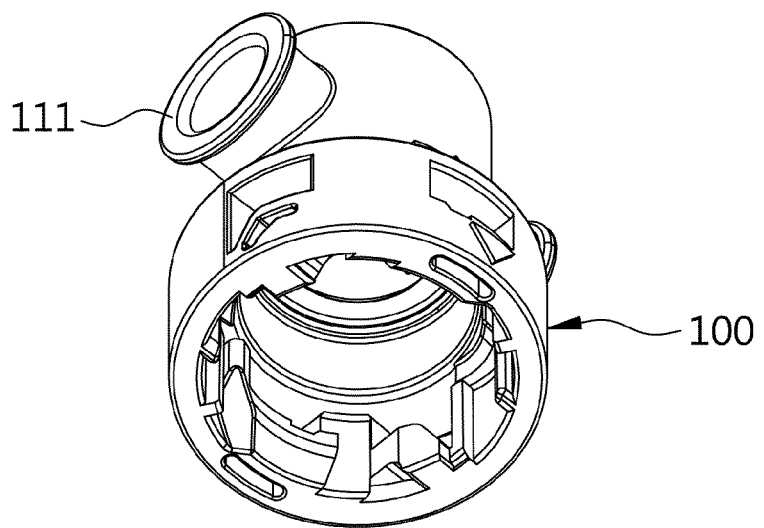
Figure 3:
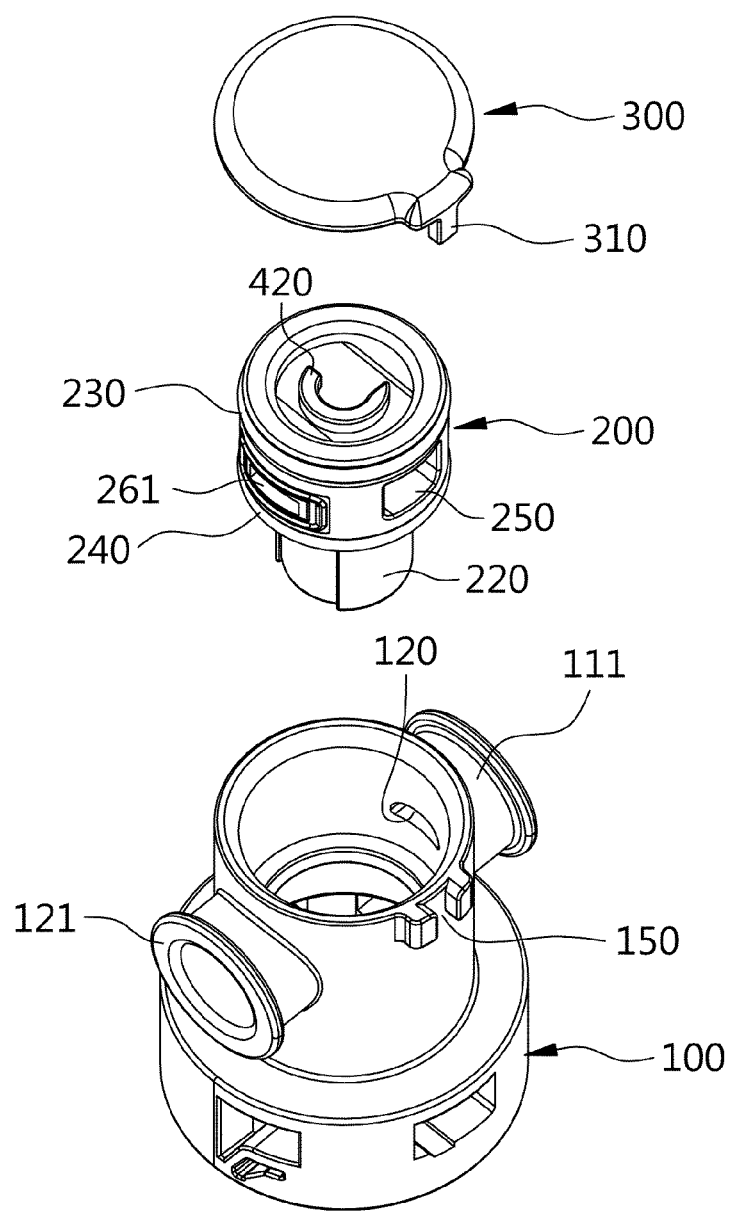
FIG. 3 is an exploded perspective view showing a state viewed from a direction different from that of FIG. 1 in order to illustrate the head assembly for a water purification filter according to the preferred first embodiment of the present invention.
Figure 4:
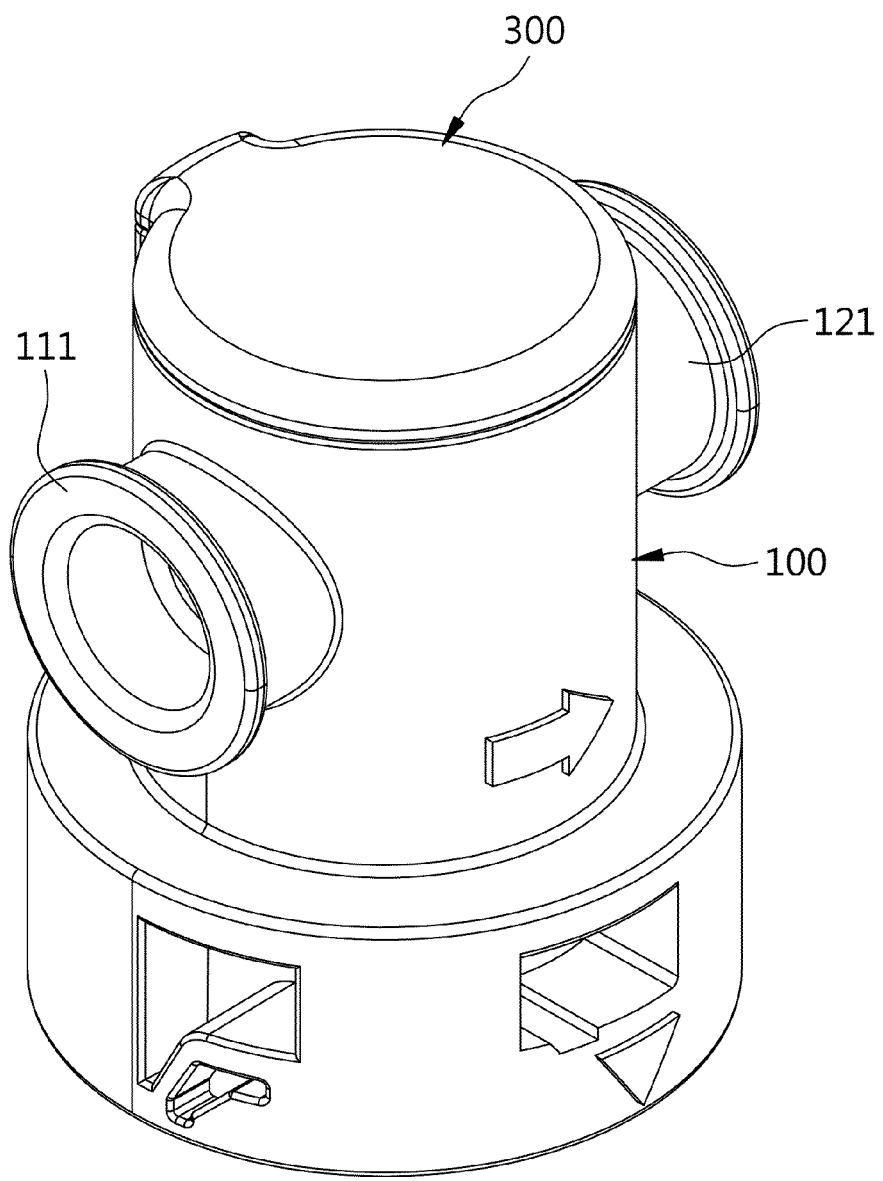
FIG. 4 is an assembled perspective view showing a state viewed from above in order to illustrate the head assembly for a water purification filter according to the preferred first embodiment of the present invention.
Figure 5:
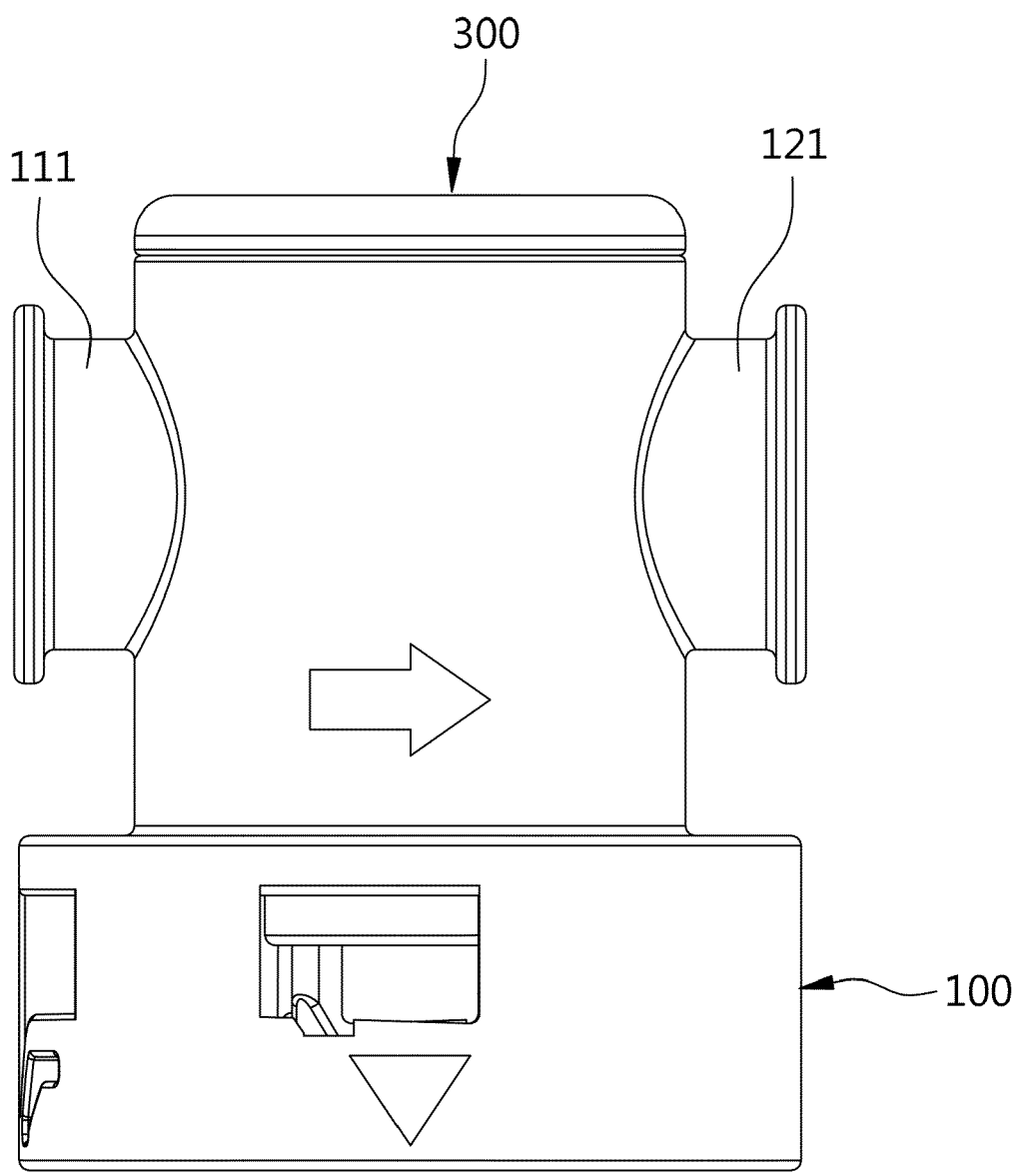
FIG. 5 is a front view shown in order to illustrate the head assembly for a water purification filter according to the preferred first embodiment of the present invention.
Figure 6:
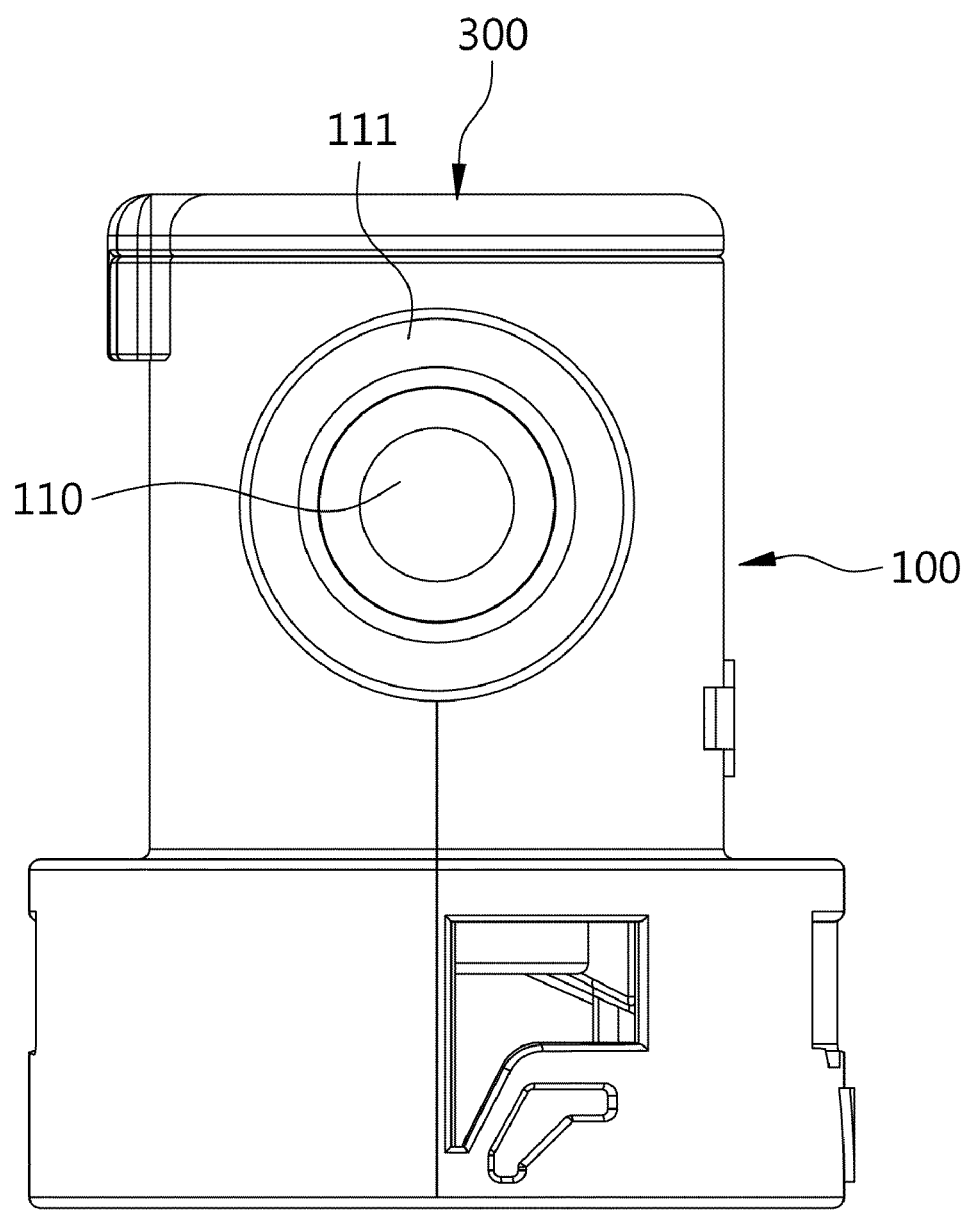
FIG. 6 is a side view shown in order to illustrate the head assembly for a water purification filter according to the preferred first embodiment of the present invention.
Figure 7:
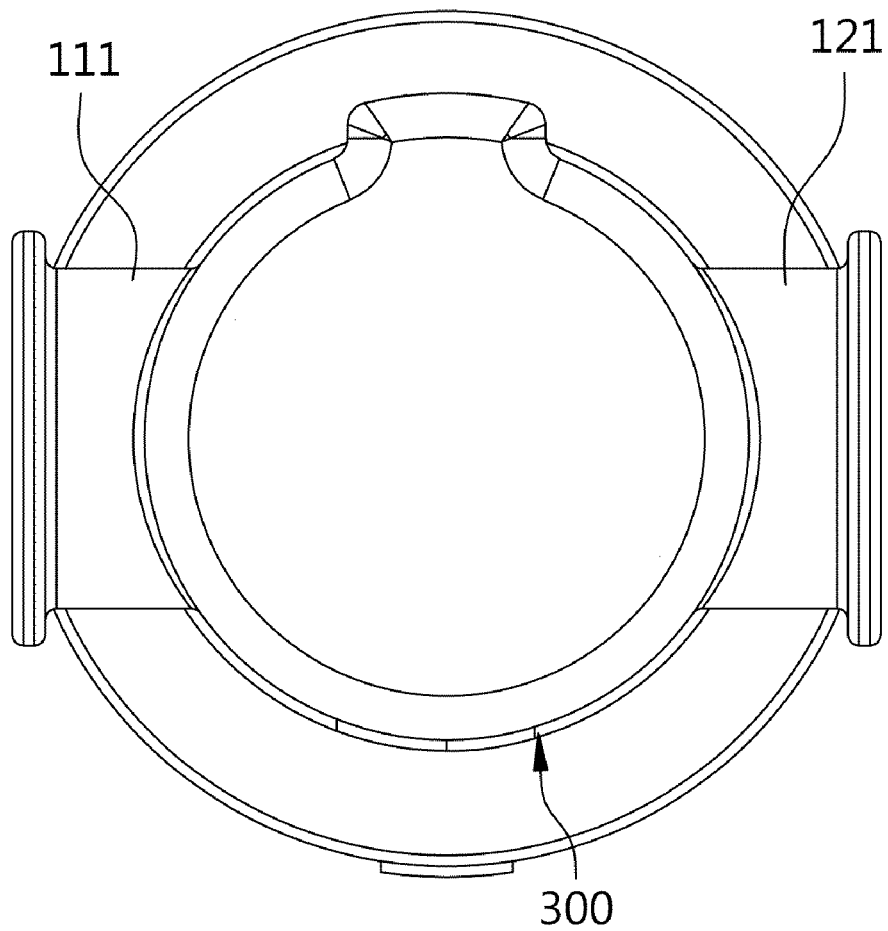
FIG. 7 is a plan view shown in order to illustrate the head assembly for a water purification filter according to the preferred first embodiment of the present invention.

The accompanying FIG. 1 is an exploded perspective view showing a state viewed from above in order to illustrate a head assembly for a water purification filter according to a first embodiment of the present invention; FIG. 2 is an exploded perspective view showing a state viewed from below in order to illustrate the head assembly for a water purification filter according to the first embodiment of the present invention; FIG. 3 is an exploded perspective view showing a state viewed from a direction different from that of FIG. 1 in order to illustrate the head assembly for a water purification filter according to the first embodiment of the present invention; and FIG. 4 is an assembled perspective view showing a state viewed from above in order to illustrate the head assembly for a water purification filter according to the first embodiment of the present invention.

As shown in these drawings, a head assembly for a water purification filter according to a first embodiment of the present invention is configured to basically include a head body 100, a rotation shaft 200, and a fastening cap 300. In particular, the rotation shaft 200 is rotated in the state of being placed on a seat protrusion 130 formed on the head body 100, and a lower seal member 240 is disposed in a portion where the rotation shaft 200 is placed on the seat protrusion 130. Accordingly, there can be prevented a problem in which the lower seal member 240 departs from a predetermined location during the coupling of the rotation shaft 200 to the head body 100 so that defective assembly occurs.

This will be described in greater detail based on individual components, as follows.

First, the head body 100 is a part which forms the appearance of the head assembly for a water purification filter and to and on which a water purification filter 10 is coupled and mounted.

The head body 100 is formed as a pipe body which is open on the top and bottom thereof. The open top end portion of the water purification filter 10 is accommodated and coupled into the lower portion of the head body 100, and an inflow hole 110 and an outflow hole 120 are formed to penetrate both sides of the circumferential surface of the head body 100.

In addition, an inflow pipe 111 configured to guide the inflow flow of raw water is formed to protrude from the portion of the circumferential surface of the head body 100 where the inflow hole 110 is formed, and an outflow pipe 121 configured to guide the discharge flow of bypassed raw water or purified water passed through the filter is formed to protrude from the portion of the circumferential surface of the head body 100 where the outflow hole 120 is formed.

Furthermore, the seat protrusion 130 is formed to protrude from the portion of the inner circumferential surface of the head body 100 immediately below the inflow hole 110 and the outflow hole 120, and is configured such that the rotation shaft 200 to be described later is rotated in the state of being seated on the seat protrusion 130.

Next, the rotation shaft 200 is a component which guides the flow of raw water, introduced through the inflow pipe 111 of the head body 100, through the water purification filter 10 or which guides the flow of raw water so that the flow of the raw water is directly discharged into the outflow pipe 121 without the intervention of the water purification filter 10.

The rotation shaft 200 includes: a seating portion 210 configured to be located between the inflow pipe 111 and the outflow pipe 121 inside the head body 100; and a coupling portion 220 configured to extend to the bottom of the seating portion 210, and configured such that the upper end portion of the water purification filter 10 is coupled thereto. The rotation shaft 200 is installed to be rotated within the head body 100 by the lateral rotation of the water purification filter 10.

In this case, a seat projection 211 configured to be located opposite to the top surface of the seat protrusion 130 is formed to protrude from the lower end-side circumferential surface of the seating portion 210 inside the head body 100, and the ring-shaped lower seal member 240 is provided between the seat projection 211 and the seat protrusion 130.

The lower seal member 240 is mounted to be located on the bottom surface of the seat projection 211 formed on the seating portion 210 after being passed through the bottom of the rotation shaft 200. Thereafter, by the operation of mounting the rotation shaft 200 downward from the open top surface of the head body 100, sealing is performed on four portions, i.e., inner and outer circumferential surfaces and upper and lower opposite surfaces between the seat projection 211 and the seat protrusion 130 located opposite to each other, while forming the state of being interposed between the seat projection 211 and the seat protrusion 130 of the head body 100.

In addition, a mounting groove 212 is formed to be recessed into the upper end-side circumferential surface of the seating portion 210 constituting part of the rotation shaft 200, and a ring-shaped upper seal member 230 is mounted in the mounting groove 212.

Furthermore, the lower end-side portion of the seat projection 211, i.e., the lower end of the seating portion 210 constituting part of the rotation shaft 200, forms a shaft end 213 having a reduced diameter so that the lower end-side portion of the seat projection 211 can be accommodated inside the seat protrusion 130 of the head body 100.

In this case, a protruding seat end 131 configured to protrude inward is further formed on the lower end-side portion of the inner circumferential surface of the seat protrusion 130, and the lower corner portion of the shaft end 213 is formed to be seated on the protruding seat end 131. Accordingly, the rotation shaft 200 can be operated while maintaining the state of being seated at an accurate location inside the head body 100 without excessively compressing the lower seal member 240 interposed between the seat projection 211 and the seat protrusion 130.

In particular, the head assembly for a water purification filter according to the first embodiment of the present invention suggests that the top surface of the protruding seat end 131 is formed to be inclined inward or rounded in a direction toward the bottom thereof and the bottom surface corner of the shaft end 213 is formed to be inclined or rounded in the same shape as the protruding seat end 131. This enables the shaft end 213 to be accurately seated on the protruding seat end 131 without being inclined, thereby enabling the rotational operation of the rotation shaft 200 to be accurately and stably performed.

Furthermore, a bypass hole 250 configured to guide raw water, introduced through the inflow pipe 111 of the head body 100, directly to the outflow pipe 121 and guide holes 261, 262, 263 and 264 configured to guide the raw water, introduced into the inflow pipe 111 of the head body 100, into the water purification filter 10 are formed in the circumferential surface of the seating portion 210 constituting part of the rotation shaft 200.

The bypass hole 250 and the guide holes 261, 262, 263 and 264 are formed in the portions of the circumferential surface of the rotation shaft 200 in directions perpendicular to each other. In particular, the guide holes 261, 262, 263 and 264 are formed not to communicate with the bypass hole 250 in the state of being blocked from the bypass hole 250.

In particular, the first embodiment of the present invention suggests that the guide holes 261, 262, 263 and 264 are configured to include: a first horizontal guide hole 261 formed to penetrate from any one circumferential surface of the rotation shaft 200 in a radial direction, and configured to receive raw water from the inflow pipe 111 and guide the flow of the raw water in a horizontal direction; a first vertical guide hole 262 formed to penetrate vertically from an end of the first horizontal guide hole 261 to the bottom thereof, and configured to guide the flow of the raw water to the inner space of the water purification filter 10; a second vertical guide hole 263 configured to guide the flow of purified water in the inner space of the water purification filter 10; and a second horizontal guide hole 264 formed to penetrate from the upper end of the second vertical guide hole 263 to the portion where the outflow pipe 121 is formed in a horizontal direction.

In other words, the raw water introduced into the inflow pipe 111 by the guide holes 261, 262, 263 and 264 is purified while passing through the water purification filter 10, and is discharged into the outflow pipe 121.

Meanwhile, when the water purification filter is manipulated through rotation, stopping needs to be achieved in the state where the inflow pipe 111 and the outflow pipe 121 have been selectively aligned with the bypass hole 250 or guide holes 261, 262, 263 and 264 depending on the rotation direction thereof.

For this purpose, the first embodiment of the present invention suggests that a stop protrusion 420 is formed to protrude from the top surface of the rotation shaft 200. The stop protrusion 420 functions to, when the rotation shaft 200 is rotated, be caught on the limiting protrusion 410 of the fastening cap 300 to be described later and prevent the rotation shaft 200 from being rotated further, thereby enabling the state where the inflow pipe 111 and the outflow pipe 121 have been accurately aligned with the bypass hole 250 or guide holes 261, 262, 263 and 264 to be maintained.

Furthermore, separate auxiliary watertight members 280 and 290 are further provided on the portions of the circumferential surface between the two seal members 230 and 240 of the rotation shaft 200, thereby enabling fluid (raw water, or purified water) passing through the inflow hole 110, the outflow hole 120 and the horizontal guide holes 261 and 264 to be prevented from entering the gap between the rotation shaft 200 and the head body 100. In this case, each of the auxiliary watertight members 280 and 290 is shaped in a rectangular ring-shaped form which surrounds the circumference of the inflow hole 110 or outflow hole 120.

Next, the fastening cap 300 is a component which limits the rotation angle of the rotation shaft 200.

The fastening cap 300 is installed to cover the open top surface of the head body 100. An angle limiting part configured to limit a relative rotation angle is provided on the bottom surface of the fastening cap 300 and the top surface of the rotation shaft 200.

In this case, although the angle limiting part may be formed in various forms, the first embodiment of the present invention suggests an example in which the angle limiting part includes a limiting protrusion 410 formed to protrude from the bottom surface of the fastening cap 300 and a protruding stop protrusion 420 formed on the top surface of the rotation shaft 200 and configured to be caught on the limiting protrusion 410 and to thus prevent the rotation shaft from being rotated further.

In this case, it is preferred that the location and shape of the limiting protrusion 410 or stop protrusion 420 are each determined to have an angular displacement of 90° according to the rotation direction of the rotation shaft 200.

The first embodiment of the present invention suggests an example in which the limiting protrusion 410 is formed to act as a stopper which functions only as a reference location and the stop protrusion 420 is formed as a semicircular protrusion whose both ends come into contact with both opposite side wall surfaces of the limiting protrusion 410 according to the rotation direction of the rotation shaft 200.

In addition, a fitting depression 150 is formed to be depressed into the upper end surface of the head body 100, and a fitting protrusion 310 is formed to protrude from the bottom surface of the fastening cap 300. In other words, due to the structures of the fitting depression 150 and the fitting protrusion 310, the fastening cap 300 can be always coupled to a predetermined location of the head body 100, and a problem in which the fastening cap 300 is rotated due to a collision between the limiting protrusion 410 and the stop protrusion 420 can be prevented when the collision between the limiting protrusion 410 and the stop protrusion 420 occurs due to the rotation of the rotation shaft 200.

Furthermore, it is preferred that a fitting projection 320 configured to be caught on the inner circumferential surface of the upper end of the head body 100 is further formed along an edge-side portion of the fastening cap 300, thereby enabling the state in which the fastening cap 300 has been stably fastened to the head body 100 to be maintained.

In the following, a process of assembling the above-described head assembly for a water purification filter according to the first embodiment of the present invention will be described in greater detail.

Figure 13:
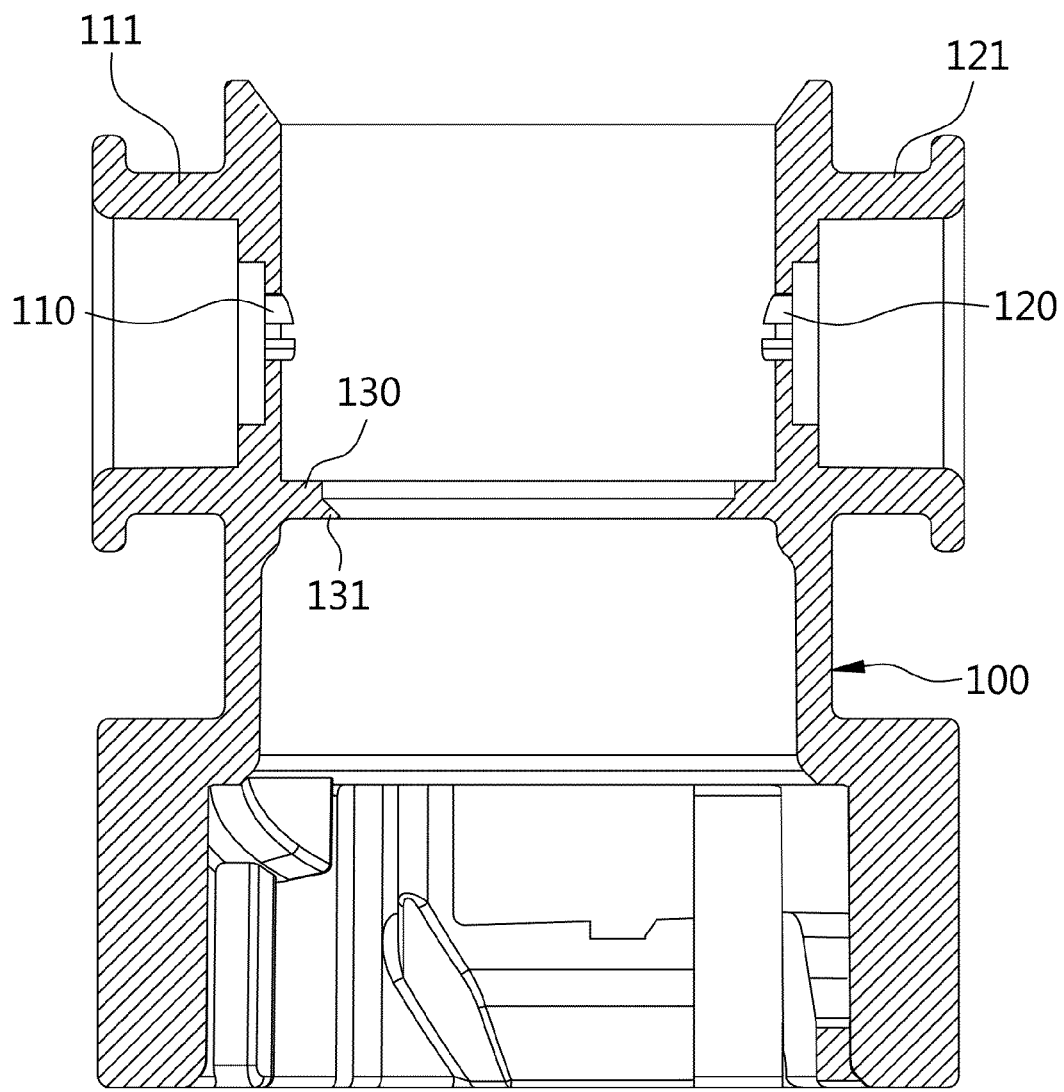
FIGS. 13 to 16 are sectional views showing the states of respective components in order to illustrate a process of assembling the head assembly for a water purification filter according to the preferred first embodiment of the present invention.
Figure 14:
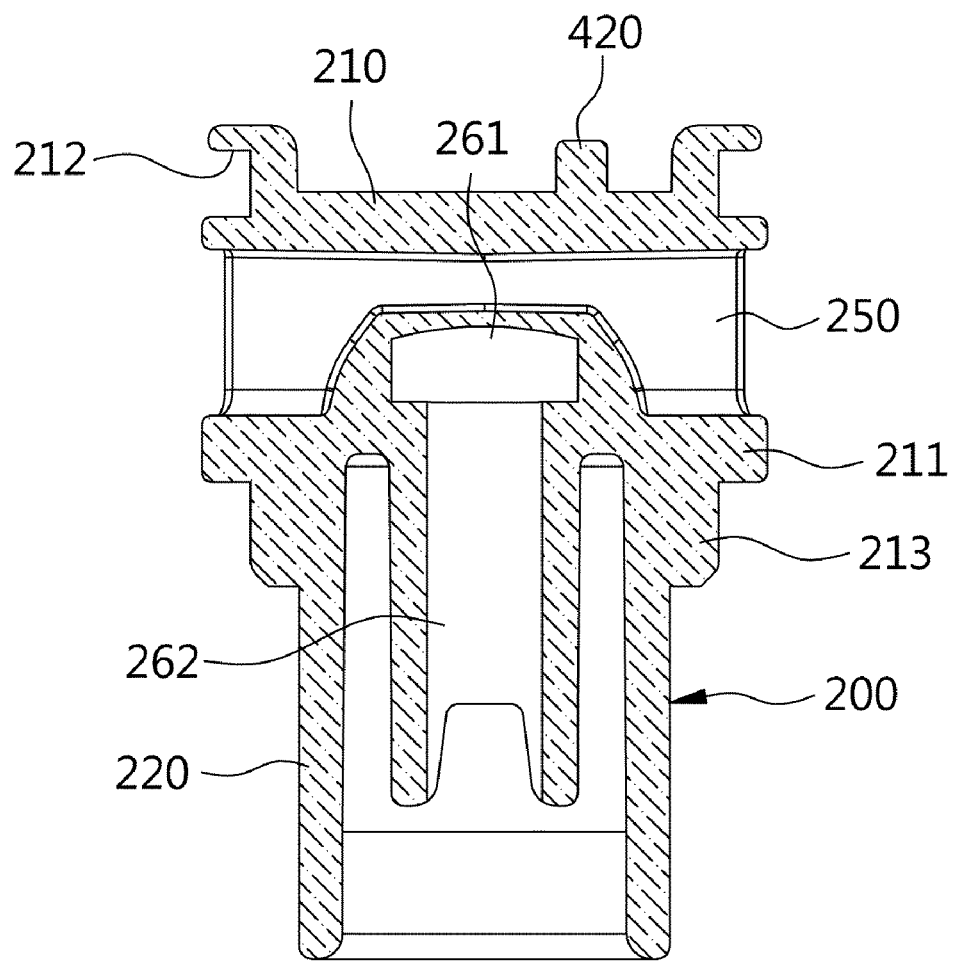

First, as shown in the accompanying FIGS. 13 and 14, the separately manufactured head body 100 and rotation shaft 200 are prepared.

Figure 15:
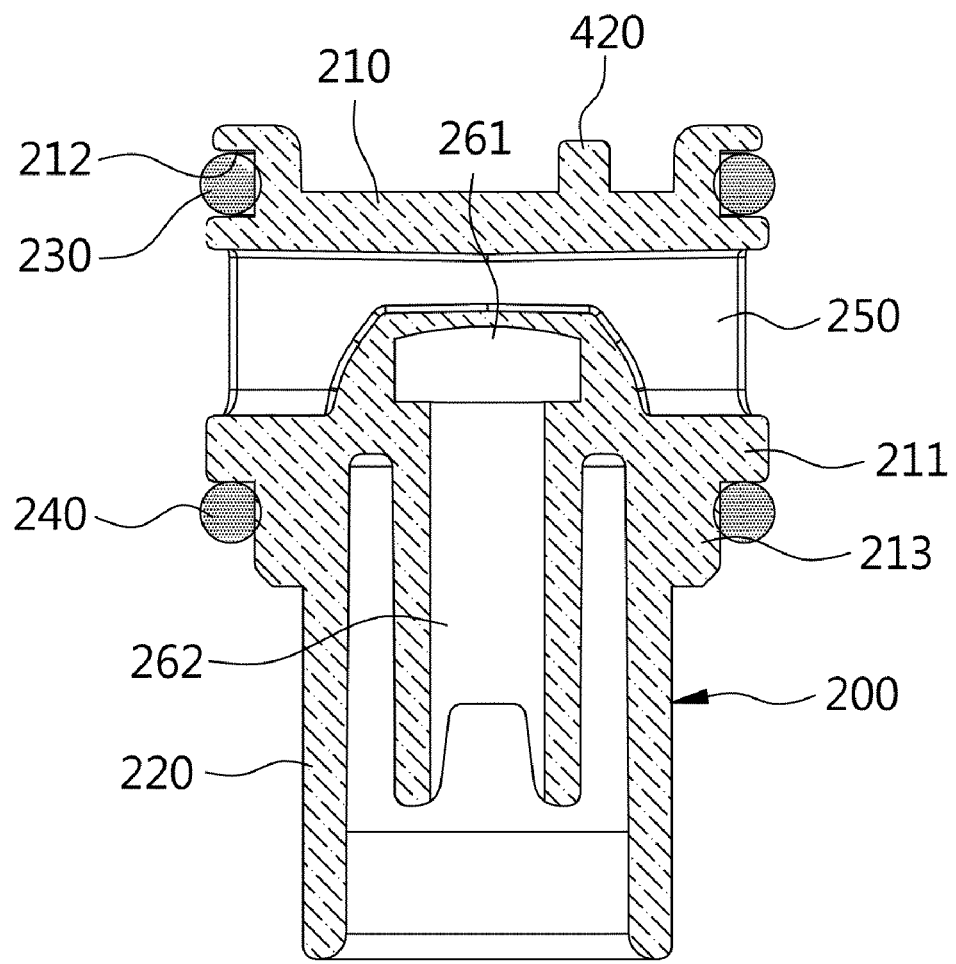

In this state, the upper seal member 230 is mounted in the mounting groove 212 of the seating portion 210 constituting part of the rotation shaft 200, and the lower seal member 240 is mounted on the circumference of the shaft end 213, i.e., the lower end-side portion of the seating portion 210. In this case, the lower seal member 240 is mounted on the bottom surface of the seat projection 211 on the circumference of the shaft end 213 after being passed through the bottom of the rotation shaft 200, which is as shown in FIG. 15.

Furthermore, when the seal members 230 and 240 have been mounted on the rotation shaft 200, the rotation shaft 200 is mounted in the head body 100.

Figure 16:
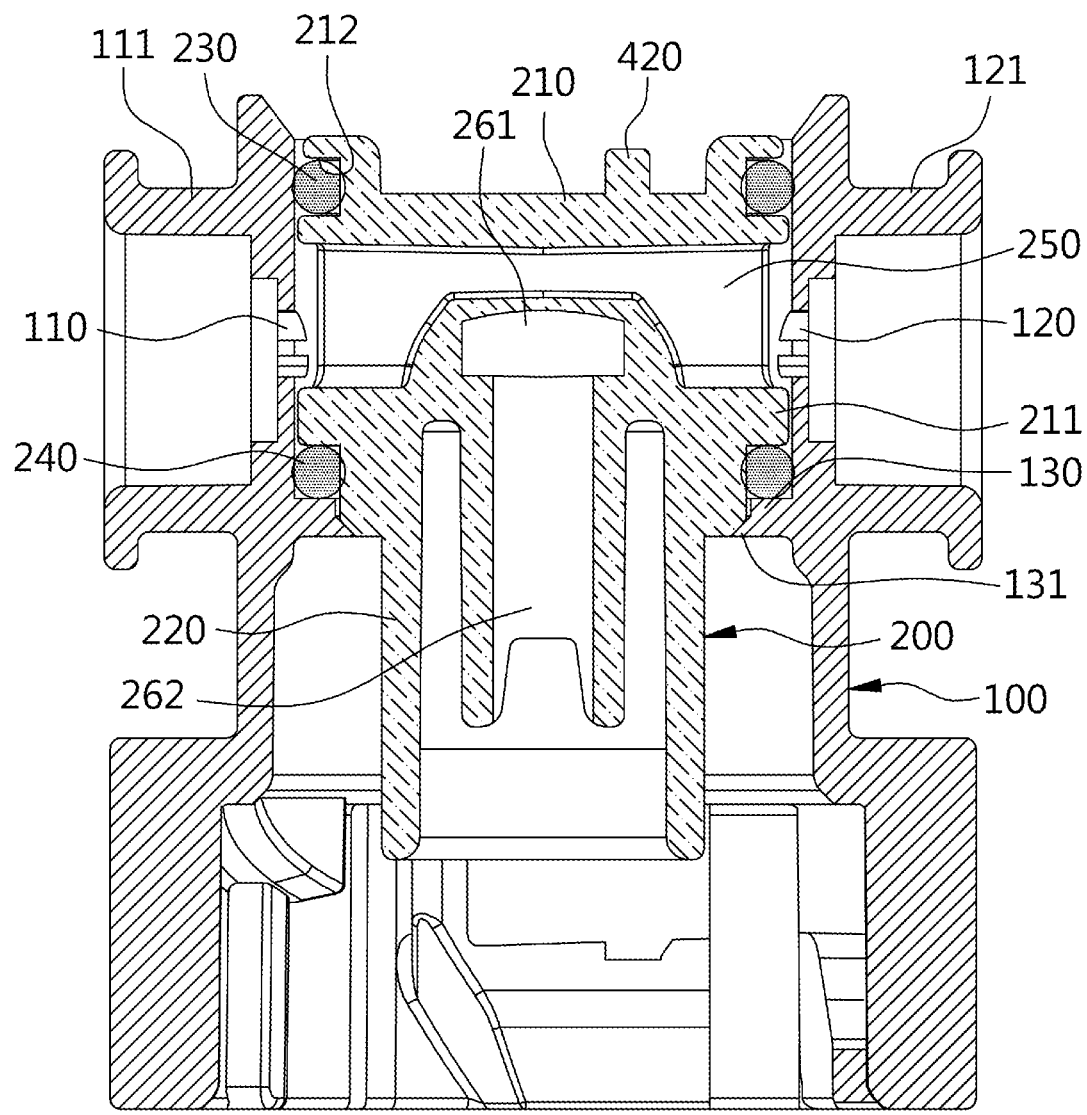
Figure 17:
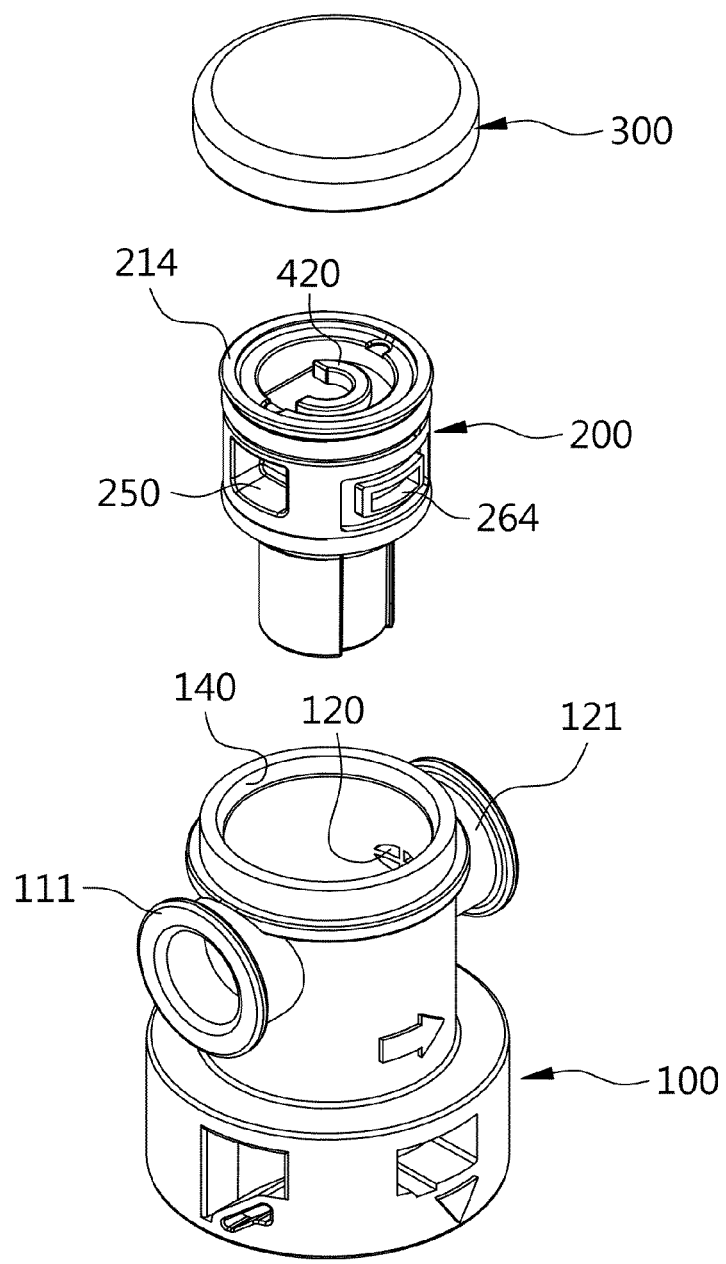
FIG. 17 is an exploded perspective view showing a state viewed from above in order to illustrate a head assembly for a water purification filter according to a second embodiment of the present invention.
Figure 18:
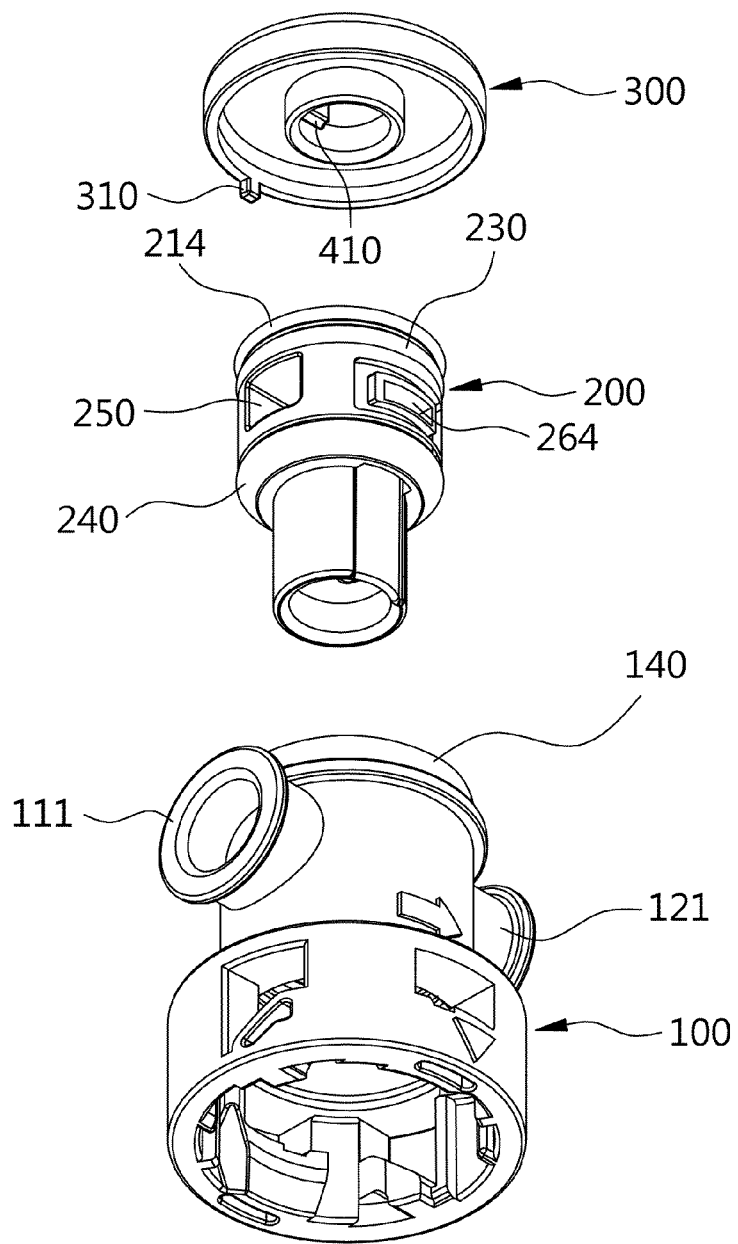
FIG. 18 is an exploded perspective view showing a state viewed from below in order to illustrate the head assembly for a water purification filter according to the second embodiment of the present invention.
Figure 19:
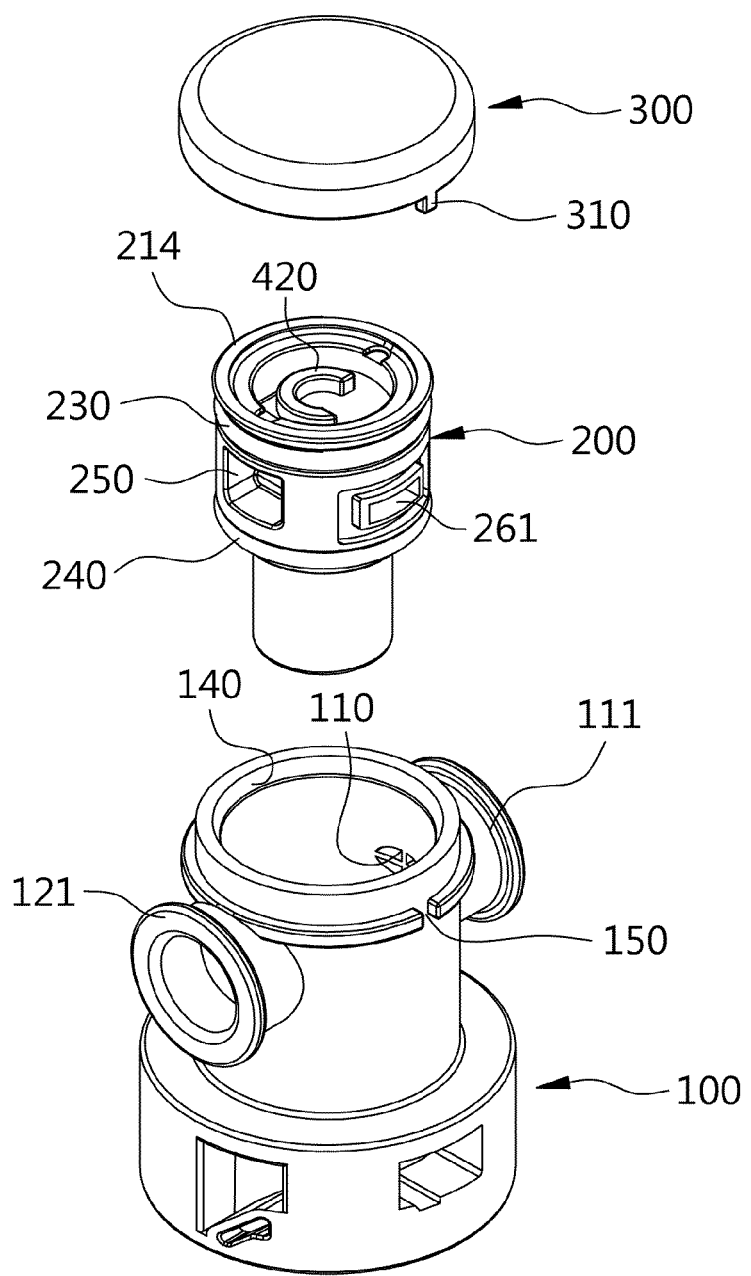
FIG. 19 is an exploded perspective view showing a state viewed from a direction different from that of FIG. 17 in order to illustrate the head assembly for a water purification filter according to the second embodiment of the present invention.
Figure 20:
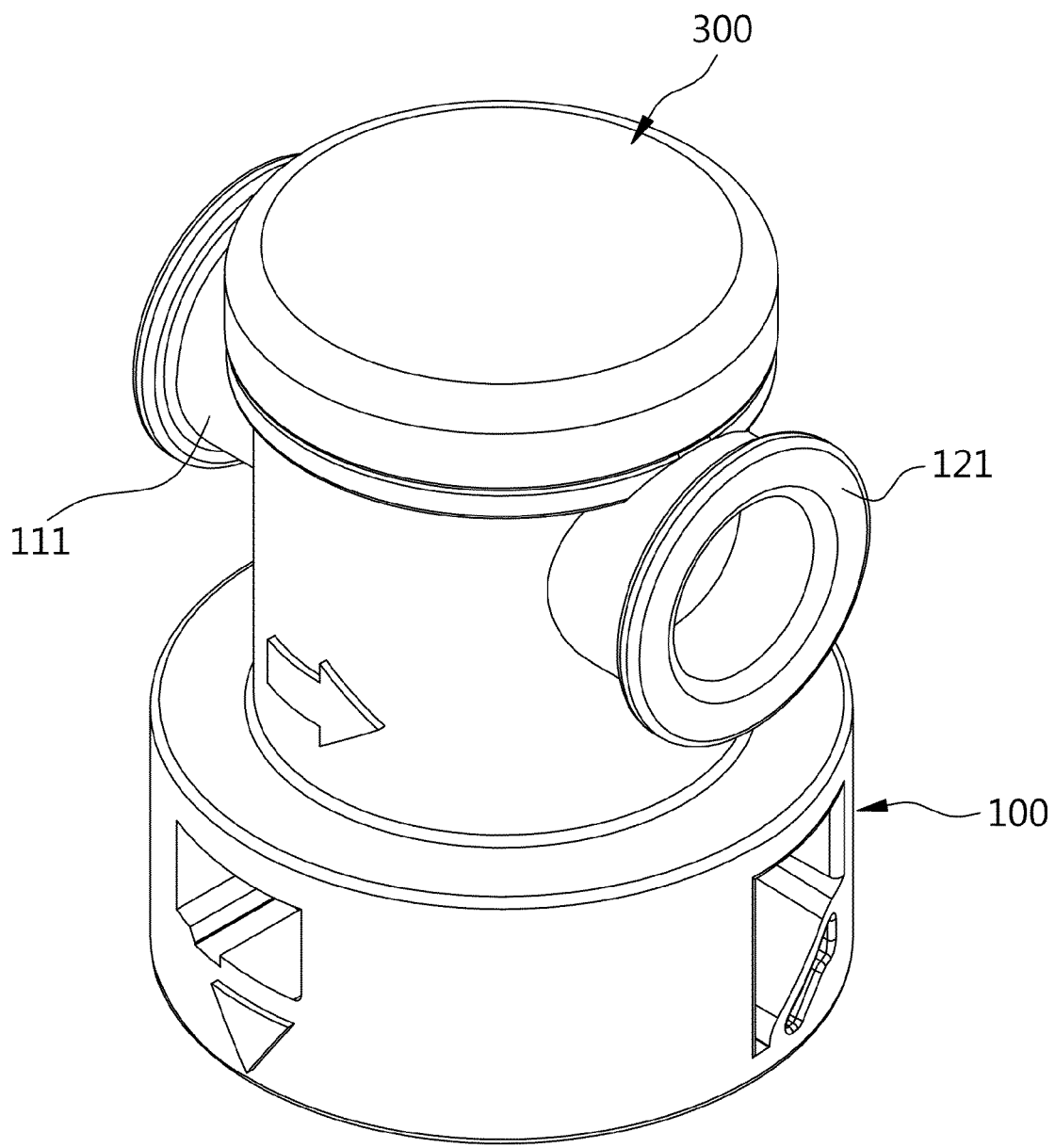
FIG. 20 is an assembled perspective view showing a state viewed from above in order to illustrate the head assembly for a water purification filter according to the second embodiment of the present invention.
Figure 21:
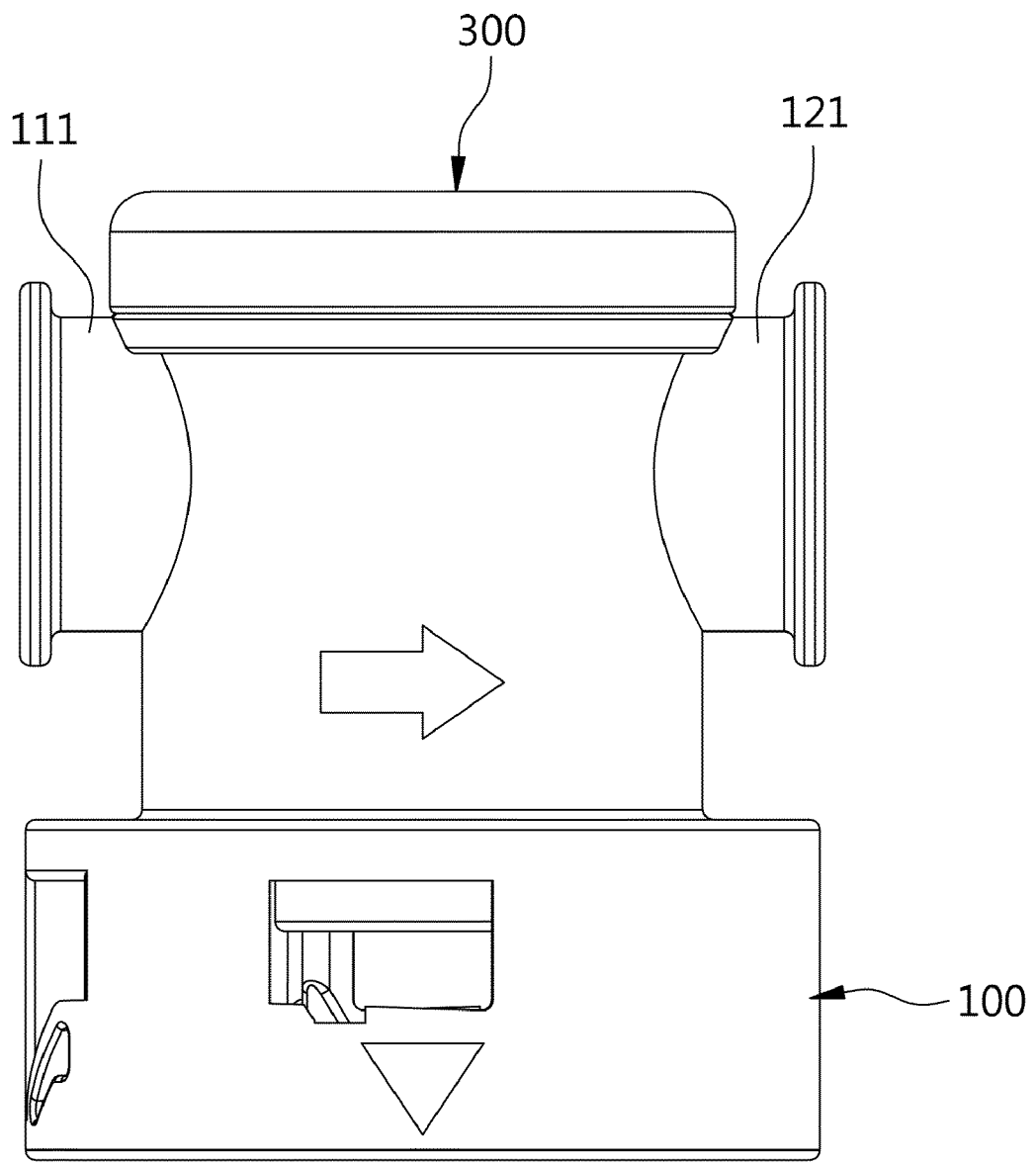
FIG. 21 is a front view shown in order to illustrate the head assembly for a water purification filter according to the second embodiment of the present invention.
Figure 22:
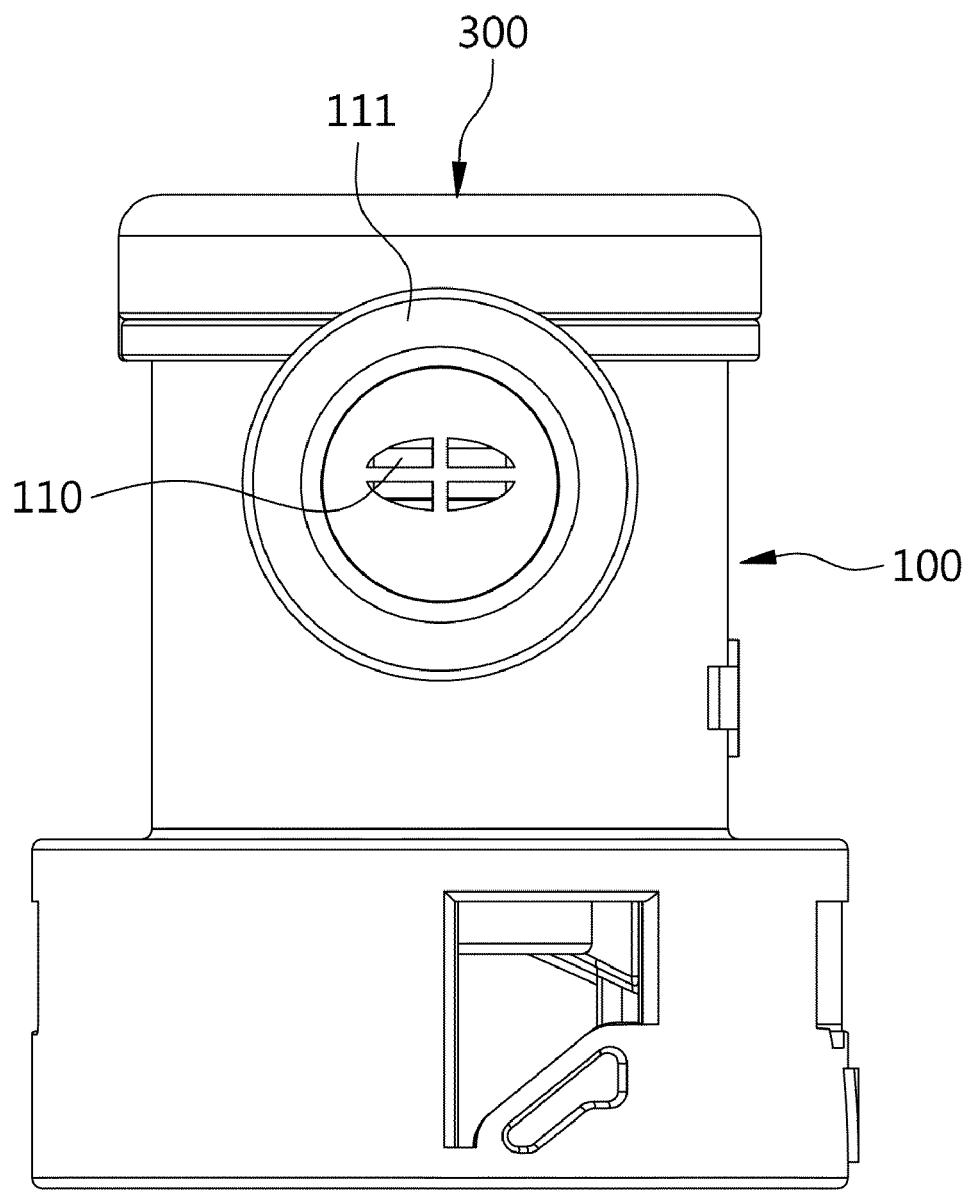
FIG. 22 is a side view shown in order to illustrate the head assembly for a water purification filter according to the second embodiment of the present invention.
Figure 23:
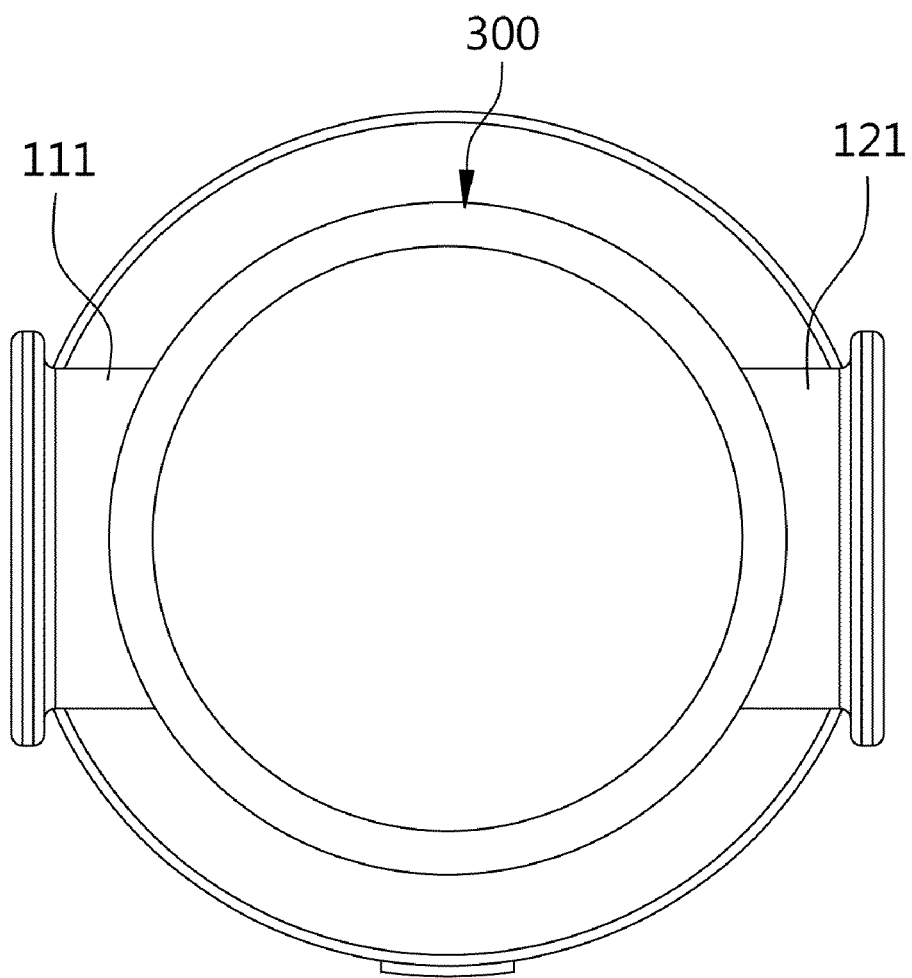
FIG. 23 is a plan view shown in order to illustrate the head assembly for a water purification filter according to the second embodiment of the present invention.

In this case, the rotation shaft 200 is mounted downward from the lower end-side portion thereof where the coupling portion 220 is located through the open top surface of the head body 100. When the shaft end 213 constituting the seating portion 210 of the rotation shaft 200 is placed on the top surface of the protruding seat end 131 formed on the seat protrusion 130 inside the head body 100 during the mounting of the rotation shaft 200, further downward movement is prevented, and thus the state of being mounted at the corresponding location is maintained, which is as shown in FIG. 16.

In addition, in the state where the shaft end 213 has been placed and seated on the protruding seat end 131 as described above, the lower seal member 240 is not excessively compressed between the seat protrusion 130 and the seat projection 211, but is compressed only sufficiently to prevent water from leaking, thereby preventing the operability of the corresponding rotation shaft 200 from being influenced.

In particular, the lower seal member 240 mounted on the rotation shaft 200 tends to be separated or depart from its location while coming into contact with a wall surface inside the head body 100, the corners of the inflow hole 110 and the outflow hole 120, etc. during the downward mounting of the rotation shaft 200. However, due to the seat projection 211, the lower seal member 240 is prevented from being separated. Furthermore, in the state where the corresponding rotation shaft 200 has been mounted, the lower seal member 240 is maintained in the state of being interposed between the seat projection 211 and the seat protrusion 130, the lower seal member 240 is prevented from departing from its location.

Thereafter, by mounting the fastening cap 300 on the open top surface of the head body 100, the head assembly for a water purification filter according to the embodiment of the present invention is completed.

Next, an operation of the above-described head assembly for a water purification filter according to the first embodiment of the present invention will be described in greater detail.

First, in the head assembly for a water purification filter according to the first embodiment of the present invention, the water purification filter 10 is mounted, a conduit adapted to supply raw water is connected to the inflow pipe 111, and a conduit adapted to provide purified water or direct water is connected to the outflow pipe 121.

In this state, a user rotates the water purification filter 100 in a clockwise direction or a counterclockwise direction depending on the desired state of raw water (purified water or direct water).

Figure 8:
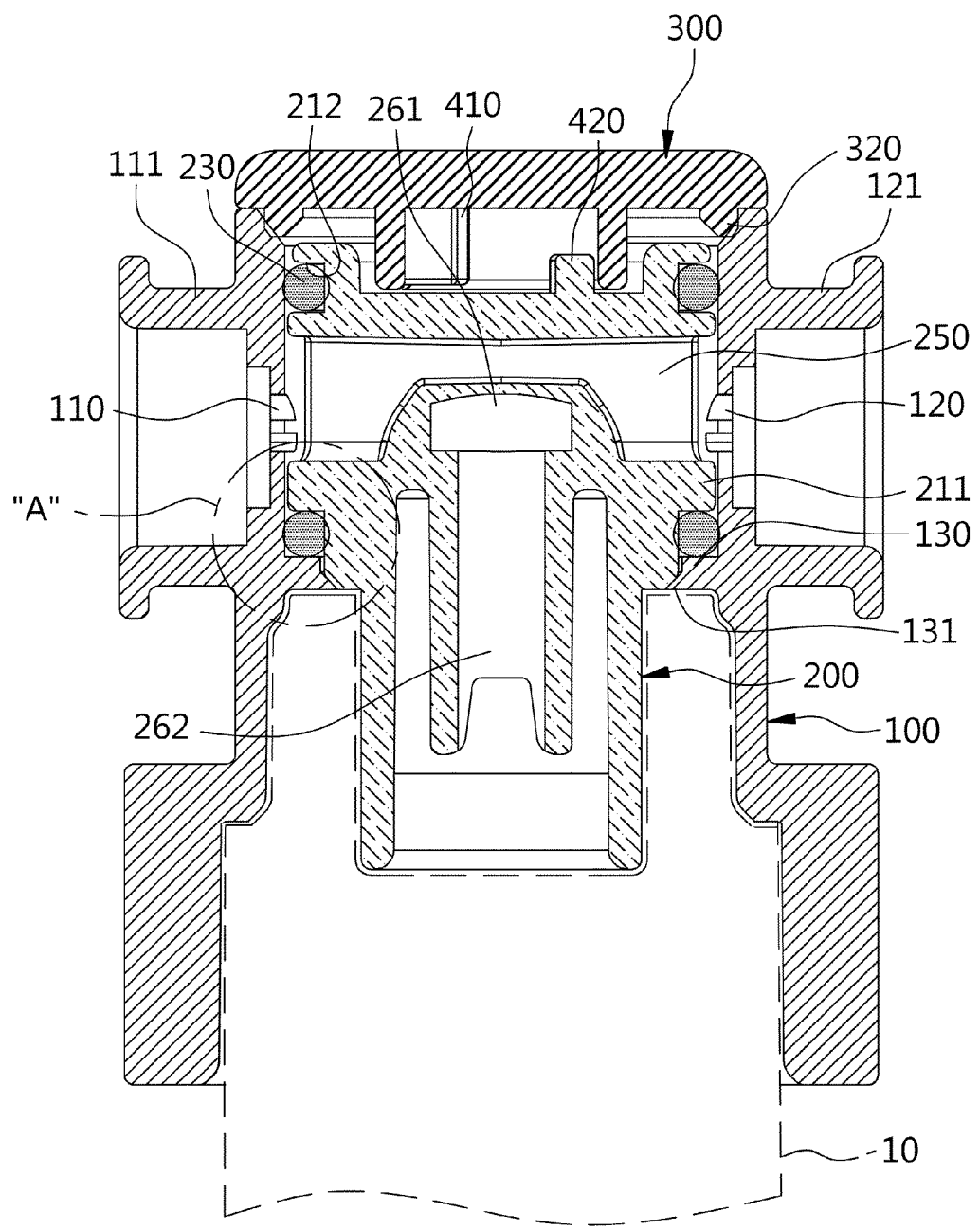
FIG. 8 is a sectional view shown in order to illustrate the state of the direct water operation of the head assembly for a water purification filter according to the preferred first embodiment of the present invention.
Figure 9:
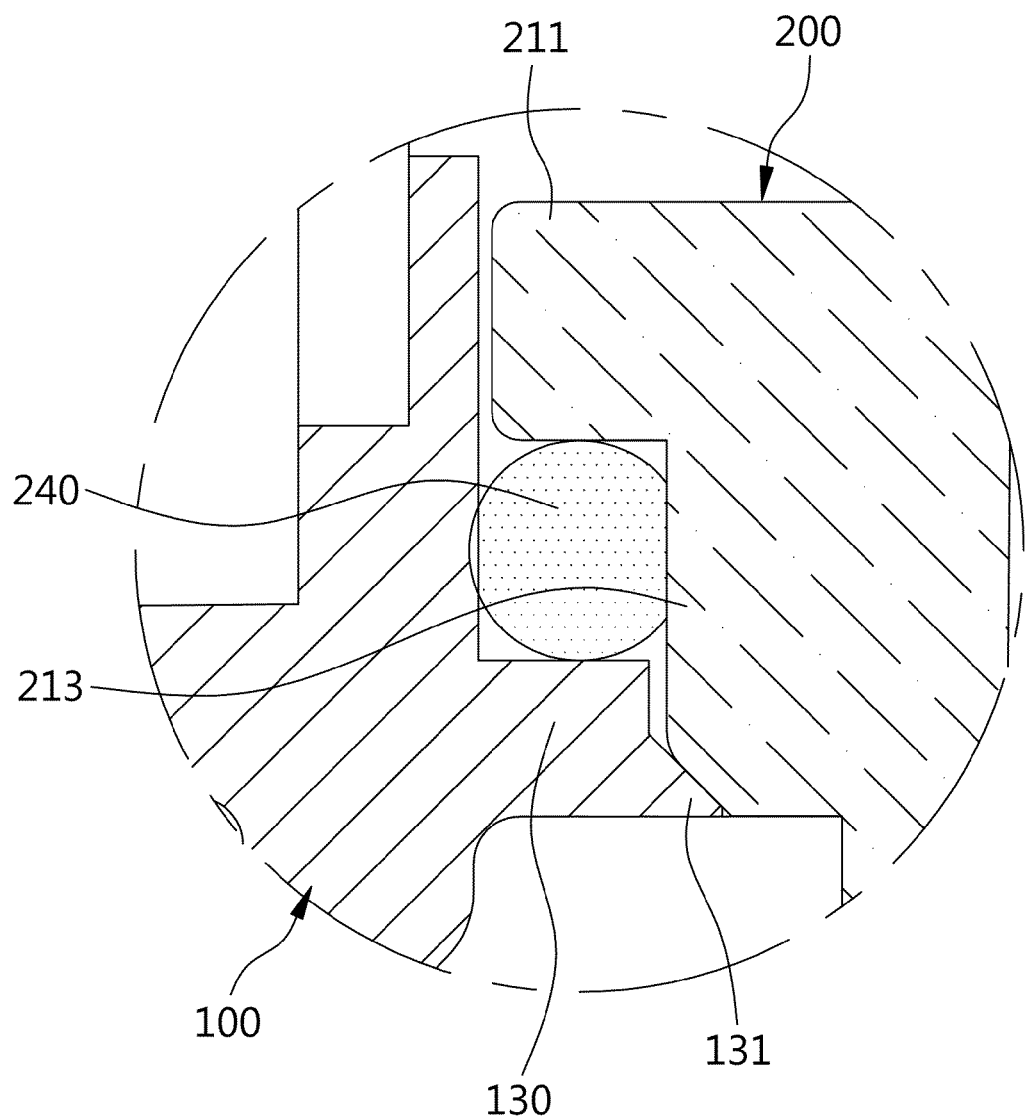
FIG. 9 is an enlarged view of portion "A" of FIG. 8.

For example, when the user desires direct water, the user rotates the water purification filter 10 in the counterclockwise direction, so that the bypass hole 250 of the rotation shaft 200 is made to be aligned with the inflow pipe 111 and outflow pipe 121 of the head body 100, as shown in FIG. 8. In this case, the rotational displacement of the stop protrusion 420 formed on the rotation shaft 200 is limited by the limiting protrusion 410 formed on the fastening cap 300, as shown in the accompanying FIG. 11, thereby enabling the bypass hole 250 of the rotation shaft 200 to be accurately aligned with the inflow pipe 111 and outflow pipe 121 of the head body 100.

As a result, raw water introduced through the inflow pipe 111 passes through the inflow hole 110 of the head body 100, is introduced into the bypass hole 250 of the rotation shaft 200, flows directly into the outflow hole 120 of the head body 100, passes through the outflow hole 120, and is then discharged through the outflow pipe 121. Accordingly, the user can be provided with the raw water as direct water.

Figure 10:
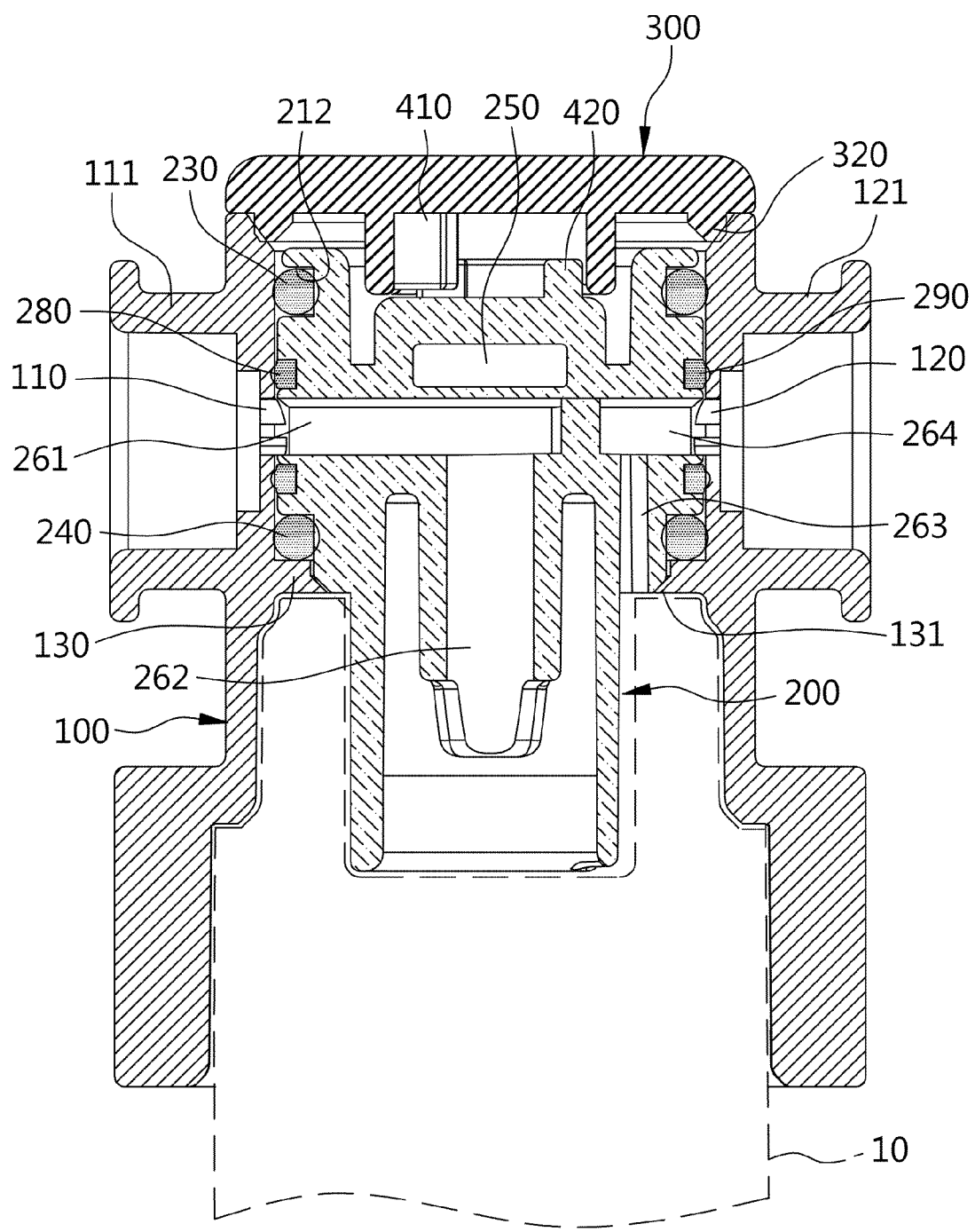
FIG. 10 is a sectional view shown in order to illustrate the state of the purified water operation of the head assembly for a water purification filter according to the preferred first embodiment of the present invention.
Figure 11:
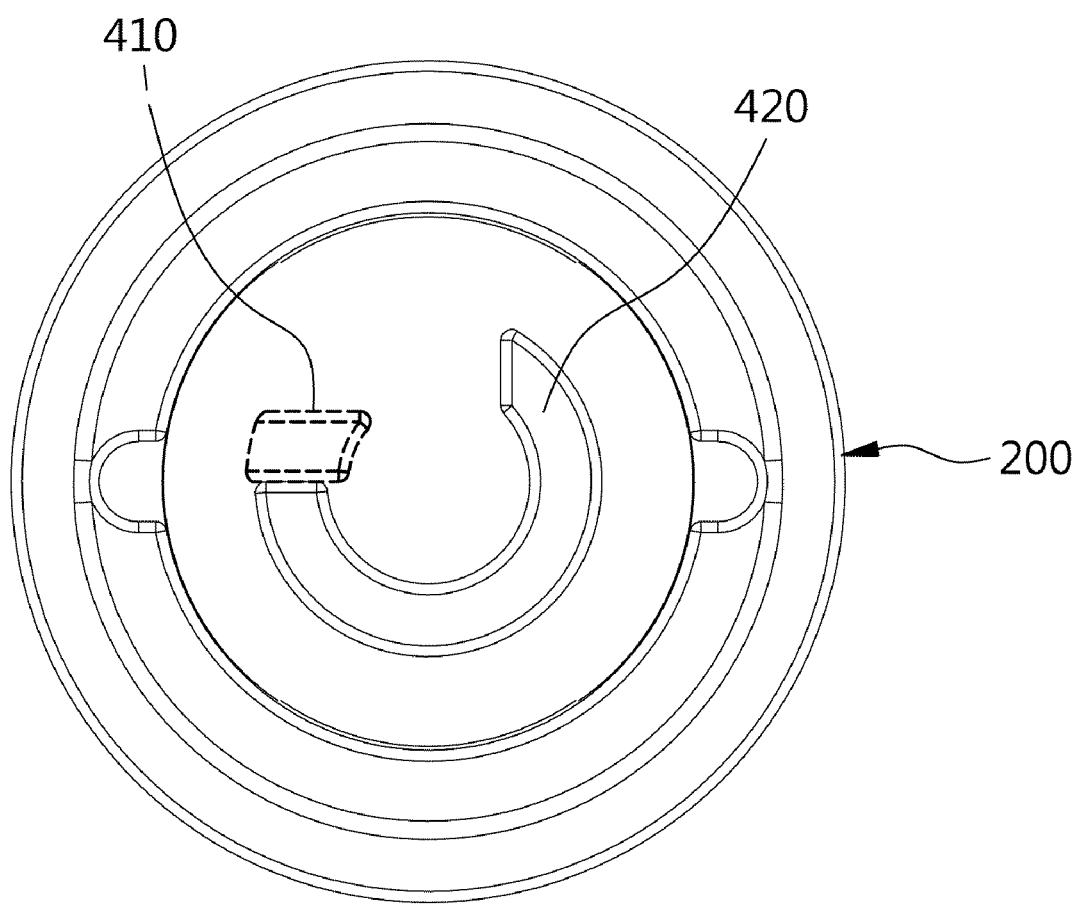
FIG. 11 is a plan view shown in order to illustrate the state of a rotation shaft during the direct water operation of the head assembly for a water purification filter according to the preferred first embodiment of the present invention.
Figure 12:
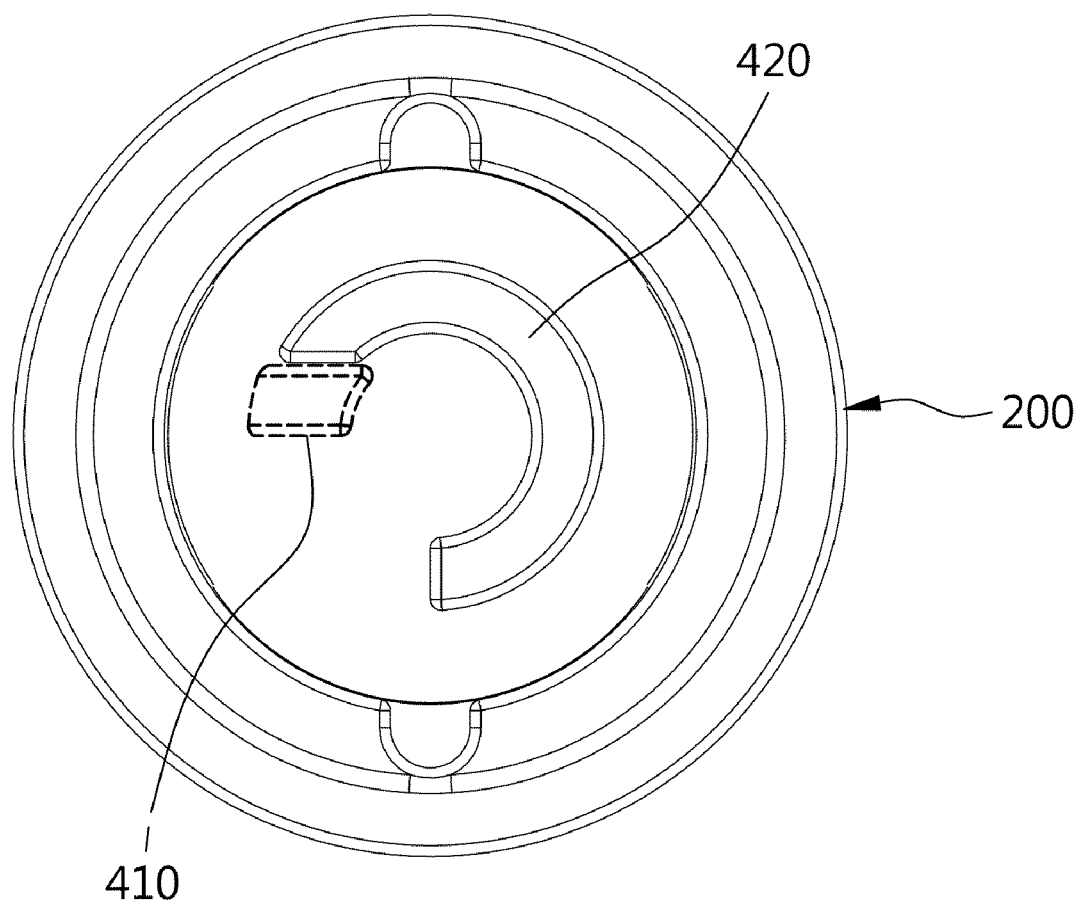
FIG. 12 is a plan view shown in order to illustrate the state of the rotation shaft during the purified water operation of the head assembly for a water purification filter according to the preferred first embodiment of the present invention.

Meanwhile, when the user desires purified water, the user rotates the water purification filter 10 in the clockwise direction, so that the first horizontal guide hole 261 of the rotation shaft 200 is made to be aligned with the inflow hole 110 of the head body 100 and the second horizontal guide hole 264 of the rotation shaft 200 is made to be aligned with the outflow hole 120 of the head body 100, as shown in the accompanying FIG. 10. In this case, the rotational displacement of the stop protrusion 420 formed on the rotation shaft 200 is limited by the limiting protrusion 410 formed on the fastening cap 300, as shown in the accompanying FIG. 12, thereby enabling the first horizontal guide hole 261 and second horizontal guide hole 264 of the rotation shaft 200 to be accurately aligned with the inflow hole 110 and outflow hole 120 of the head body 100.

As a result, raw water introduced through the inflow pipe 111 passes through the inflow hole 110, flows through the first horizontal guide hole 261 of the rotation shaft 200, flows downward through the first vertical guide hole 262 communicating with an end of the inside of the first horizontal guide hole 261, is provided into the inner space of the water purification filter 10, and is purified. Thereafter, the purified water flows through the second vertical guide hole 263, sequentially passes through the second horizontal guide hole 264 and the outflow hole 120, and is provided to the user through the outflow pipe 121. Accordingly, the user can be provided with purified water.

As a result, the head assembly for a water purification filter according to the present invention enables use for the purpose of the provision of direct water without passage via the water purification filter 10 or use for the purpose of the provision of purified water through passage via the water purification filter 10, and also enables the control of the use for the respective purposes to be accurately performed.

Furthermore, in the head assembly for a water purification filter according to the present invention, the plurality of seal members 230 and 240 are additionally installed on the circumferential surface, and the lower seal member 240 located on the lower portion of the rotation shaft 200 is configured to seal the gap between the bottom surface and circumferential surface of the rotation shaft 200. Accordingly, water-tightness can be more stably performed, and also a problem in which the lower seal member 240 is separated or departs from a predetermined location even does not occur even when the rotation shaft 200 is caught on a corner portion of the inflow hole 110 or outflow hole 120 during the mounting of the rotation shaft 200 in the head body 100.

Meanwhile, the accompanying FIGS. 17 to 25 show a head assembly for a water purification filter according to a second embodiment of the present invention.

The head assembly for a water purification filter according to the second embodiment of the present invention suggests that a structure in which a rotation shaft 200 is seated in a head body 100 and a structure in which a fastening cap 300 is coupled onto a head body 100 are formed, unlike in the above-described head assembly for a water purification filter according to the first embodiment.

In other words, an inclined seat end 140 inclined to gradually extend further in an upward direction is formed on the inner circumferential surface of an upper end in the head body 100 constituting part of the head assembly for a water purification filter according to the second embodiment of the present invention, and an inclined and extended end 214 formed to gradually extend further in an upward direction so as to be seated on the inclined seat end 140 of the head body 100 is formed on the outer circumferential surface of the upper end of the rotation shaft 200. Accordingly, the rotation shaft 200 can be operated in the state of being seated at an accurate location inside the head body 100.

Furthermore, the fastening cap 300 is installed to cover the upper end of the head body 100, rather than being placed on the open top surface of the head body 100. A fitting protrusion 310 configured to be caught and restrained by the fitting depression 150 of the head body 100 so as to limit the rotation angle of the rotation shaft 200 is formed to protrude from any one portion of the bottom surface of an edge portion constituting part of the fastening cap 300.

In the following, an operation of the above-described head assembly for a water purification filter according to the second embodiment of the present invention will be described in greater detail.

First, in the head assembly for a water purification filter according to the second embodiment of the present invention, the water purification filter 10 is mounted, a conduit adapted to supply raw water is connected to the inflow pipe 111, and a conduit adapted to provide purified water or direct water is connected to the outflow pipe 121.

In this state, a user rotates the water purification filter 100 in a clockwise direction (a right direction based on the accompanying FIG. 21) or a counterclockwise direction (a left direction based on the accompanying FIG. 21) depending on the desired state of raw water (purified water or direct water).

Figure 24:
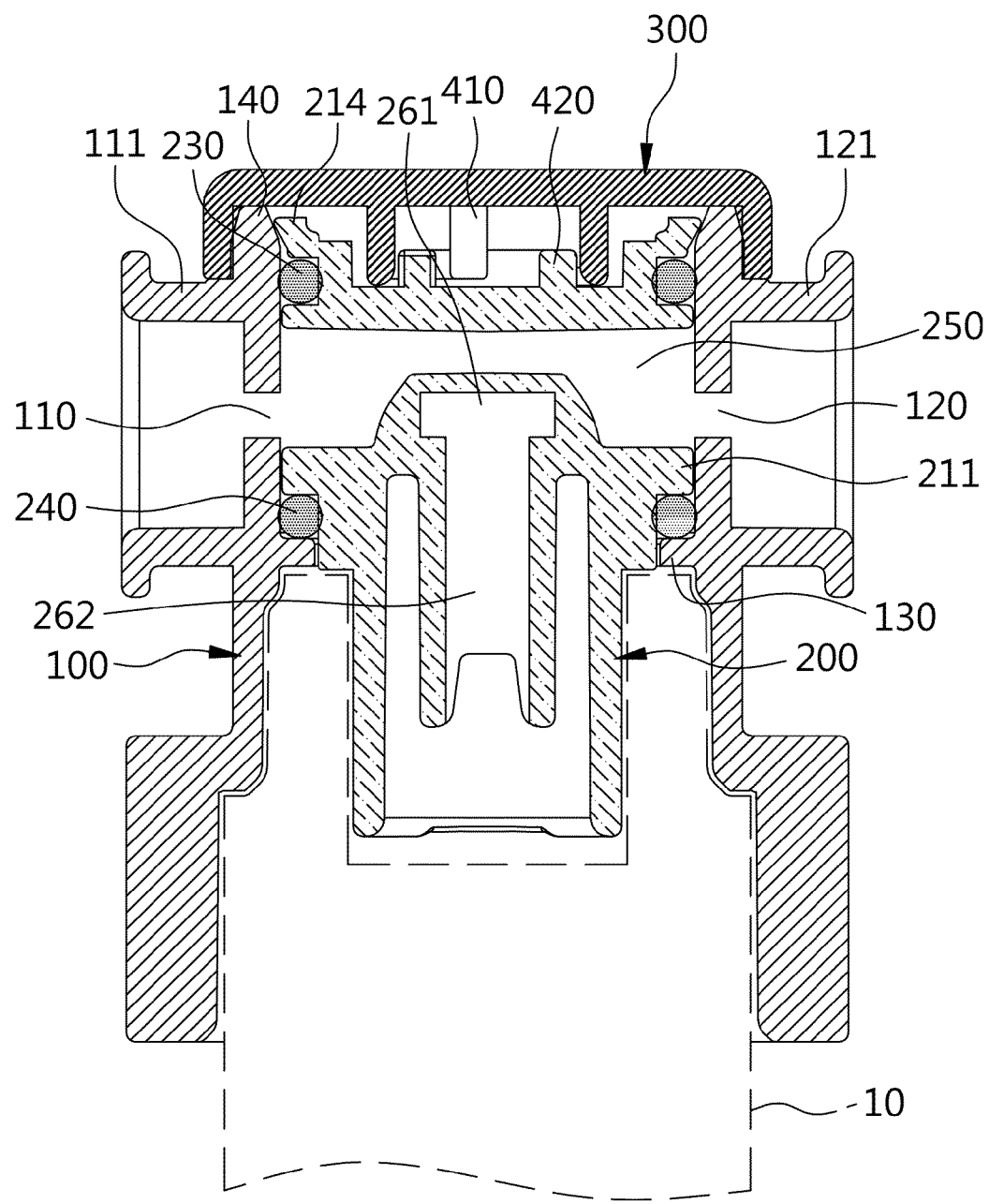
FIG. 24 is a sectional view shown in order to illustrate the state of the direct water operation of the head assembly for a water purification filter according to the second embodiment of the present invention.

For example, when the user desires direct water, the user rotates the water purification filter 10 in the counterclockwise direction, so that the bypass hole 250 of the rotation shaft 200 is made to be aligned with the inflow pipe 111 and outflow pipe 121 of the head body 100, as shown in the accompanying FIG. 24. In this case, the rotational displacement of the stop protrusion 420 of the rotation shaft 200 is limited by the limiting protrusion 410 of the fastening cap 300 (see FIG. 11), thereby enabling the bypass hole 250 of the rotation shaft 200 to be accurately aligned with the inflow pipe 111 and outflow pipe 121 of the head body 100.

Accordingly, raw water introduced through the inflow pipe 111 passes through the inflow hole 110 of the head body 100, flows into the bypass hole 250 of the rotation shaft 200, flows directly into the outflow hole 120 of the head body 100, passes through the outflow hole 120, and is discharged through the outflow pipe 121. Accordingly, the user is provided with the raw water as direct water.

Figure 25:
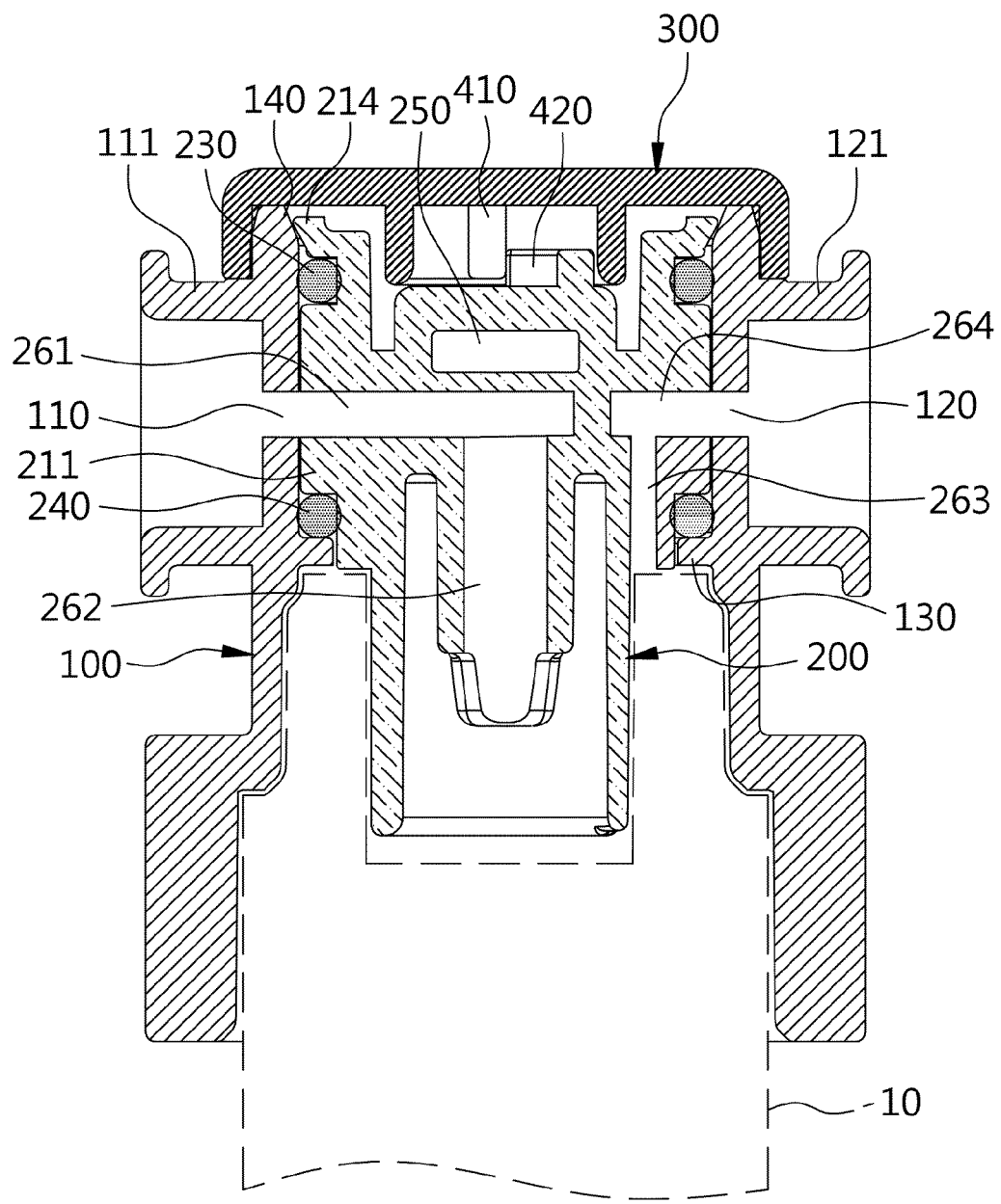
FIG. 25 is a sectional view shown in order to illustrate the state of the purified water operation of the head assembly for a water purification filter according to the second embodiment of the present invention.

Meanwhile, when the user desires purified water, the user rotates the water purification filter 10 in the clockwise direction, so that the first horizontal guide hole 261 of the rotation shaft 200 is made to be aligned with the inflow hole 110 of the head body 100 and the second horizontal guide hole 264 of the rotation shaft 200 is made to be aligned with the outflow hole 120 of the head body 100, as shown in the accompanying FIG. 25. In this case, the rotational displacement of the stop protrusion 420 of the rotation shaft 200 is limited by the fastening cap 300 of the limiting protrusion 410, as shown in the accompanying FIG. 12, thereby enabling the first horizontal guide hole 261 and second horizontal guide hole 264 of the rotation shaft 200 to be accurately aligned with the inflow hole 110 and outflow hole 120 of the head body 100.

Accordingly, raw water introduced through the inflow pipe 111 passes through the inflow hole 110, flows through the first horizontal guide hole 261 of the rotation shaft 200, flows downward through the first vertical guide hole 262 communicating with an end of the inside of the first horizontal guide hole 261, is provided into the inner space of the water purification filter 10, and is purified. Thereafter, the purified water flows through the second vertical guide hole 263, sequentially passes through the second horizontal guide hole 264 and the outflow hole 120, and is provided to the user through the outflow pipe 121. Accordingly, the user can be provided with purified water.

The invention claimed is:

1. A head assembly for a water purification filter, the head assembly comprising:
a head body formed as a pipe body open on a top and bottom thereof while forming an appearance of the head assembly, and configured such that an open upper end of a water purification filter is accommodated in a lower portion thereof, an inflow pipe and an outflow pipe are provided on both sides thereof, and a seat protrusion is formed to protrude from an inner circumferential surface thereof; and
a rotation shaft: configured to include a seating portion located between the inflow pipe and the outflow pipe inside the head body and installed to be rotatable in a lateral direction in a state of being placed on the seat protrusion, and a coupling portion configured to extend to a bottom of the seating portion while having a smaller diameter than the seating portion and to be coupled to the water purification filter; and configured such that a bypass hole configured to guide raw water, introduced through the inflow pipe of the head body, directly to the outflow pipe and guide holes configured to guide the raw water, introduced into the inflow pipe of the head body, into the water purification filter are formed in a circumferential surface of the seating portion,
wherein:
a protruding seat end configured to protrude inward is further formed on a lower end-side portion of an inner circumferential surface of the seat protrusion; and
a lower end of the seating portion constituting part of the rotation shaft forms a shaft end having a reduced diameter so that the lower end of the seating portion is placed on the protruding seat end while being accommodated inside the seat protrusion.

2. The head assembly of claim 1, wherein:
a seat projection located opposite to a top surface of the seat protrusion inside the head body is formed to protrude from a lower end-side circumferential surface of the seating portion constituting part of the rotation shaft;
a ring-shaped lower seal member is provided between the seat projection and the seat protrusion; and
a ring-shaped upper seal member is mounted on an upper end-side circumferential surface of the seating portion constituting part of the rotation shaft.

3. The head assembly of claim 1, wherein:
the protruding seat end is formed to be inclined inward or rounded in a direction toward a bottom thereof; and
a corner of a bottom surface of the shaft end of the seating portion constituting part of the rotation shaft is formed to be placed on the protruding seat end while having a structure of being inclined or rounded in a same shape as the protruding seat end.

4. The head assembly of claim 1, wherein:
a fastening cap is further provided on an open top surface of the head body; and
a limiting protrusion is formed to protrude from a bottom surface of the fastening cap and a protruding stop protrusion formed to protrude so as to caught on the limiting protrusion of the fastening cap when the rotation shaft is rotated and to thus prevent the rotation shaft from being rotated further is formed on a top surface of the rotation shaft so that a relative rotation angle between the fastening cap and the rotation shaft is limited.

* * * * *